(12) United States Patent
Yamaoka et al.

(10) Patent No.: US 11,731,637 B2
(45) Date of Patent: Aug. 22, 2023

(54) DRIVER ASSISTANCE SYSTEM

(71) Applicant: TOYOTA JIDOSHA KABUSHIKI KAISHA, Toyota (JP)

(72) Inventors: Masaaki Yamaoka, Tokyo-to (JP); Florin Baiduc, Chiba (JP); Yuki Yoshihama, Tokyo-to (JP); Masayasu Tanase, Ichikawa (JP); Toshinobu Watanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 17/173,558

(22) Filed: Feb. 11, 2021

(65) Prior Publication Data

US 2021/0245769 A1 Aug. 12, 2021

(30) Foreign Application Priority Data

Feb. 12, 2020 (JP) ................................ 2020-021648

(51) Int. Cl.
*B60W 40/09* (2012.01)
*B60W 30/14* (2006.01)
(Continued)

(52) U.S. Cl.
CPC ........ *B60W 40/09* (2013.01); *B60W 30/0956* (2013.01); *B60W 30/143* (2013.01);
(Continued)

(58) Field of Classification Search
CPC ............. B60W 40/09; B60W 30/0956; B60W 30/143; B60W 2540/229; B60W 2050/0075
See application file for complete search history.

(56) References Cited

U.S. PATENT DOCUMENTS 9,308,914 B1 4/2016 Sun et al.
2004/0209594 A1* 10/2004 Naboulsi ............. H04M 1/6083
455/403

(Continued)

FOREIGN PATENT DOCUMENTS

CN 103370252 A 10/2013
CN 105072986 A 11/2015
(Continued)

*Primary Examiner* — Jeff A Burke
*Assistant Examiner* — Mohamad O El Sayah
(74) *Attorney, Agent, or Firm* — Dickinson Wright, PLLC

(57) ABSTRACT

A driver assistance control device includes a detection part detecting a degree of concentration of a driver; an acquisition part acquiring assistance levels set by the driver; a driver assistance control part performing a plurality of the functions; and a changing part automatically changing setting of the plurality of the functions in accordance with the degree. The changing part automatically changes the settings of first driver assistance functions including one of a plurality of the functions so that the assistance levels become higher than the levels set by the driver when the degree becomes lower than a first value, and automatically changes the settings of second driver assistance functions including at least another of a plurality of the functions so that the assistance levels become higher than the levels set by the driver when the degree becomes lower than a second value different from the first value.

9 Claims, 13 Drawing Sheets

(51) Int. Cl.
*B60W 30/095* (2012.01)
*B60W 50/00* (2006.01)

(52) U.S. Cl.
CPC ............. *B60W 2050/0075* (2013.01); *B60W 2540/229* (2020.02)

(56) References Cited

U.S. PATENT DOCUMENTS

| | | | |
|---|---|---|---|
| 2011/0022298 A1* | 1/2011 | Kronberg | G01C 21/3484 |
| | | | 701/532 |
| 2012/0025993 A1* | 2/2012 | Akiyama | B60K 28/06 |
| | | | 340/576 |
| 2012/0212353 A1 | 8/2012 | Fung et al. | |
| 2016/0029940 A1* | 2/2016 | Iizuka | B60K 28/00 |
| | | | 701/23 |
| 2018/0037260 A1 | 2/2018 | Otake et al. | |
| 2018/0072310 A1* | 3/2018 | Fung | G01C 21/3697 |
| 2018/0357894 A1* | 12/2018 | Bjersing | G08G 1/0141 |
| 2021/0188288 A1* | 6/2021 | Yagi | B60J 3/04 |

FOREIGN PATENT DOCUMENTS

| | | |
|---|---|---|
| JP | H10315800 A | 12/1998 |
| JP | 2009048307 A | 3/2009 |
| JP | 2012053746 A | 3/2012 |
| JP | 2016135665 A | 7/2016 |
| JP | 2018020682 A | 2/2018 |
| JP | 2018151941 A | 9/2018 |

* cited by examiner

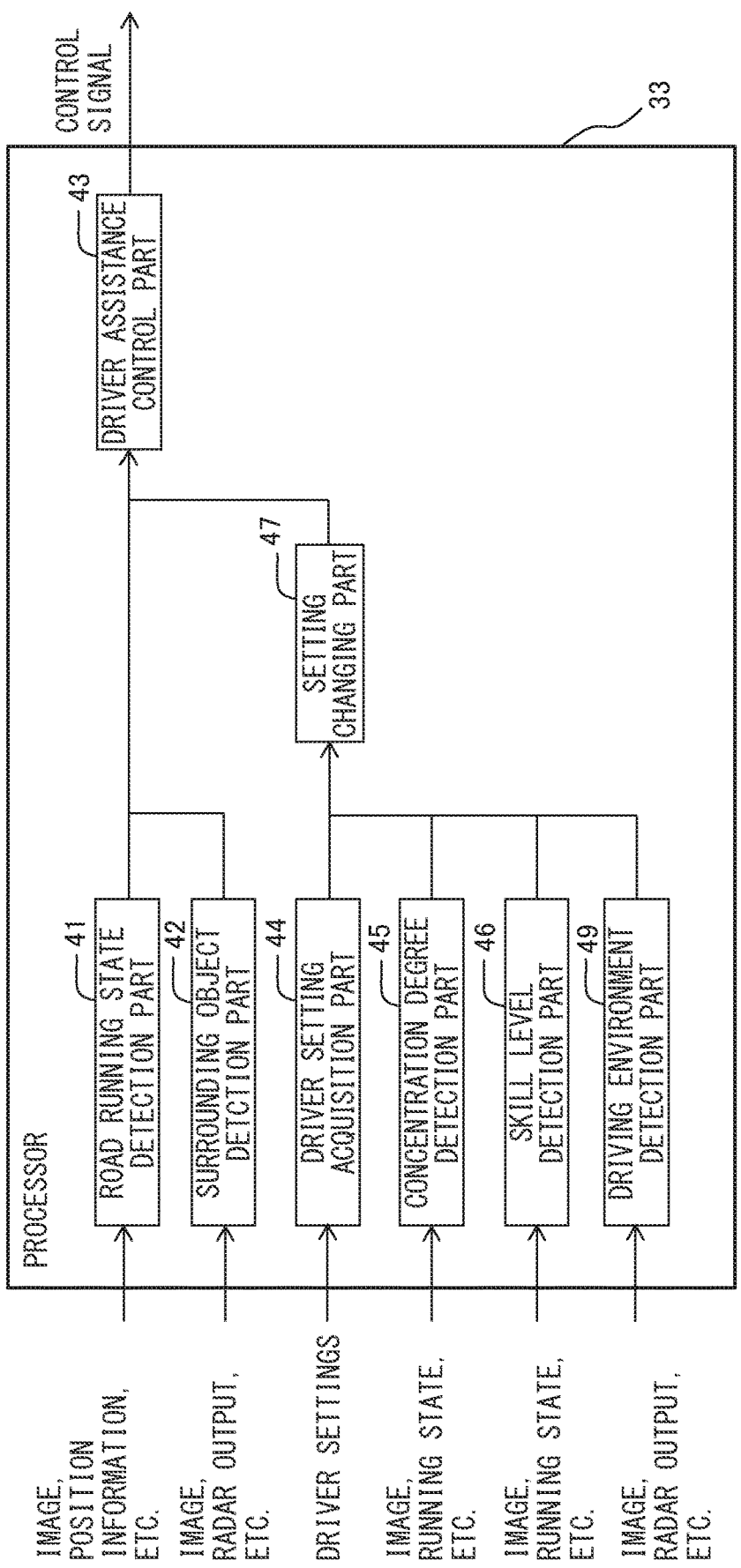

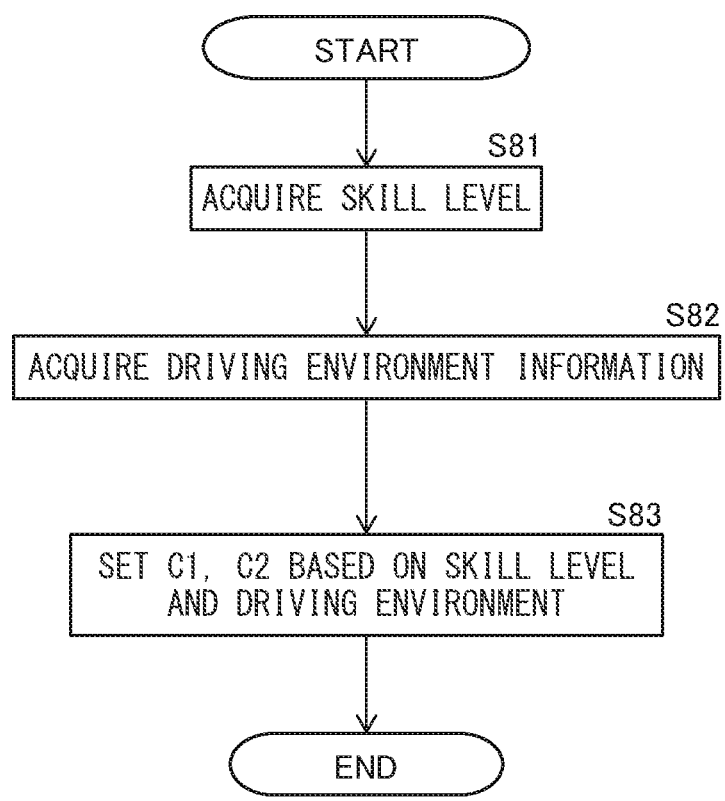

DRIVER ASSISTANCE SYSTEM

FIELD

The present disclosure relates to a driver assistance system.

BACKGROUND

Known in the past has been a driver assistance system using radar, cameras, etc. to detect a situation in the surroundings of a vehicle and performing driver assistance functions assisting driving by a driver in accordance with the situation in the surroundings of the vehicle (for example, PTLs 1 to 5). Such driver assistance functions include, for example, control for issuance of a warning prompting the driver to pay attention according to the situation in the surroundings of the vehicle, and control for automatically performing some of the driving operations of the vehicle in accordance with the situation in the surroundings of the vehicle.

For example, in PTL 1, the attributes of the driver (age, gender, etc.) are estimated from a facial image, etc., of the driver, and degrees of driver assistance are set in accordance with the estimated attributes. In addition, in PTL 1, the driving proficiency of the driver is learned based on the history of driving operations by the driver, and the degrees of driver assistance are set based on the learned driving proficiency.

Further, the driver assistance system described in PTL 1 performs a number of driver assistance functions. Such driver assistance functions include, for example, collision avoidance assistance control for assisting avoidance of collisions with obstacles in the surroundings of a vehicle, adaptive cruise control (ACC) for adjusting a speed of a vehicle so as to follow a preceding vehicle at a certain distance, and lane departure avoidance assistance control for assisting avoidance of departure of a vehicle from a lane being run in.

CITATIONS LIST

Patent Literature

[PTL 1] Japanese Unexamined Patent Publication No. 2009-048307
[PTL 2] Japanese Unexamined Patent Publication No. 2016-135665
[PTL 3] Japanese Unexamined Patent Publication No. H10-315800
[PTL 4] Japanese Unexamined Patent Publication No. 2018-151941
[PTL 5] Japanese Unexamined Patent Publication No. 2018-020682

SUMMARY

In this regard, if the degree of concentration of the driver with respect to driving becomes low, the ability of the driver to drive the vehicle falls. Therefore, the levels of driver assistance for maintaining suitable driving of the vehicle change in accordance with the degree of concentration. Further, in a driver assistance system able to perform a plurality of driver assistance functions, the assistance level required for the degree of concentration will differ for each driver assistance function.

In this regard, the attributes and the driving proficiency of the driver will not change in a short period. Accordingly, in the driver assistance system according to PTL 1, the levels of assistance do not change much at all during one driving period (in the period from which the ignition switch of the vehicle is turned on to when it is turned off). Therefore, with such a driver assistance system, it was not possible to perform suitable driver assistance corresponding to the degree of concentration of the driver.

In consideration of the above problem, an object of the present disclosure is to provide a driver assistance system able to perform a plurality of driver assistance functions wherein it is made possible to perform suitable driver assistance corresponding to the degree of concentration of the driver.

The present invention was made so as to solve the above problem and has as its gist the following.

(1) A driver assistance system provided with a driver assistance control device,
the driver assistance control device comprising:
a concentration degree detection part detecting a value of a parameter relating to a degree of concentration of a driver with respect to driving of the vehicle;
a driver setting acquisition part acquiring assistance levels of driver assistance functions set by the driver;
a driver assistance control part performing a plurality of driver assistance functions assisting driving by the driver; and
a setting changing part automatically changing settings of the plurality of driver assistance functions in accordance with the detected value of the parameter, wherein
the setting changing part automatically changes the settings of first driver assistance functions including at least one of a plurality of driver assistance functions so that the assistance levels become higher than the levels set by the driver when the degree of concentration of the driver with respect to driving of the vehicle becomes lower and the value of the parameter becomes a first value, and automatically changes the settings of second driver assistance functions including at least another of a plurality of driver assistance functions so that the assistance levels become higher than the levels set by the driver when the degree of concentration of the driver with respect to driving of the vehicle becomes lower and the value of the parameter becomes a second value different from the first value.

(2) The driver assistance system according to above (1), wherein
the first driver assistance functions are auxiliary system driver assistance functions for assisting driving by the driver and the second driver assistance functions are safety system driver assistance functions for raising the safety of the vehicle,
the auxiliary system driver assistance functions include an adaptive cruise control function adjusting a speed of the vehicle so as to following a preceding vehicle at a certain distance,
the safety system driver assistance functions include at least one driver assistance function among a collision avoidance assistance function assisting avoidance of collision with an object at the surroundings of the vehicle and a lane departure avoidance assistance function assisting avoidance of departure of the vehicle from a lane being run on.

(3) The driver assistance system according to above (2), wherein the second value is a value showing a higher degree of concentration of the driver with respect to driving of the vehicle, compared with the first value.

(4) The driver assistance system according to above (2), wherein the second value is a value showing a lower degree of concentration of the driver with respect to driving of the vehicle, compared with the first value.

(5) The driver assistance system according to any one of above (2) to (4), wherein the driver assistance control device further comprises a surrounding environment detection part detecting a surrounding environment of the vehicle, and the setting changing part does not change the settings of part of the driver assistance functions without regard as to the value of the parameter, when the surrounding environment is in a specific environment.

(6) The driver assistance system according to any one of above (2) to (5), wherein the driver assistance control device further comprises a skill level detection part detecting a skill level of a driver relating to driving of the vehicle, and the setting changing part modifies at least one of the first value and the second value so that the settings of the driver assistance functions are changed when the degree of concentration is lower as the skill level of the driver is higher.

(7) The driver assistance system according to any one of above (2) to (6), wherein when after automatically changing the assistance levels of the driver assistance functions, the value of the parameter changes to a value showing a higher degree of concentration of driver with respect to driving of the vehicle than the first value or the second value, the setting changing part returns the assistance levels of the driver assistance functions to the levels before the automatic change.

(8) The driver assistance system according to above (7), wherein even if the value of the parameter changes to a value showing a higher degree of concentration of the driver with respect to driving of the vehicle than the first value or the second value after automatically changing the setting of the collision avoidance assistance function from the stopped state to the operating state, the setting changing part does not change the setting of the collision avoidance assistance function from the operating state to the stopped state.

(9) The driver assistance system according to any one of above (2) to (8), wherein when after automatically changing the assistance levels of the driver assistance functions, the user manually changes the settings of the assistance levels of the driver assistance functions, the setting changing part does not automatically change the assistance levels of the driver assistance functions even if the value of the parameter becomes a value showing a lower degree of concentration of the driver with respect to driving of the vehicle compared with the first value or second value.

(10) The driver assistance system according to any one of above (2) to (9), further comprising a driving environment detection part detecting a driving environment of a driver relating to a future degree of concentration of the driver, wherein the setting changing part modifies at least one of the first value and the second value, when the driving environment of the driver is an environment where the future degree of concentration of the driver will fall.

According to the present disclosure, it becomes possible to provide a driver assistance system able to perform a plurality of driver assistance functions wherein it is made possible to perform suitable driver assistance corresponding to the degree of concentration of the driver.

BRIEF DESCRIPTION OF DRAWINGS

FIG. 12 is a functional block diagram, similar to FIG. 3, of a processor of an ECU relating to driver assistance processing in a driver assistance system according to a fourth embodiment.

FIG. 13 is a flow chart of processing for setting a first reference value and second reference value relating to a degree of awakeness.

DESCRIPTION OF EMBODIMENTS

Figure 1:
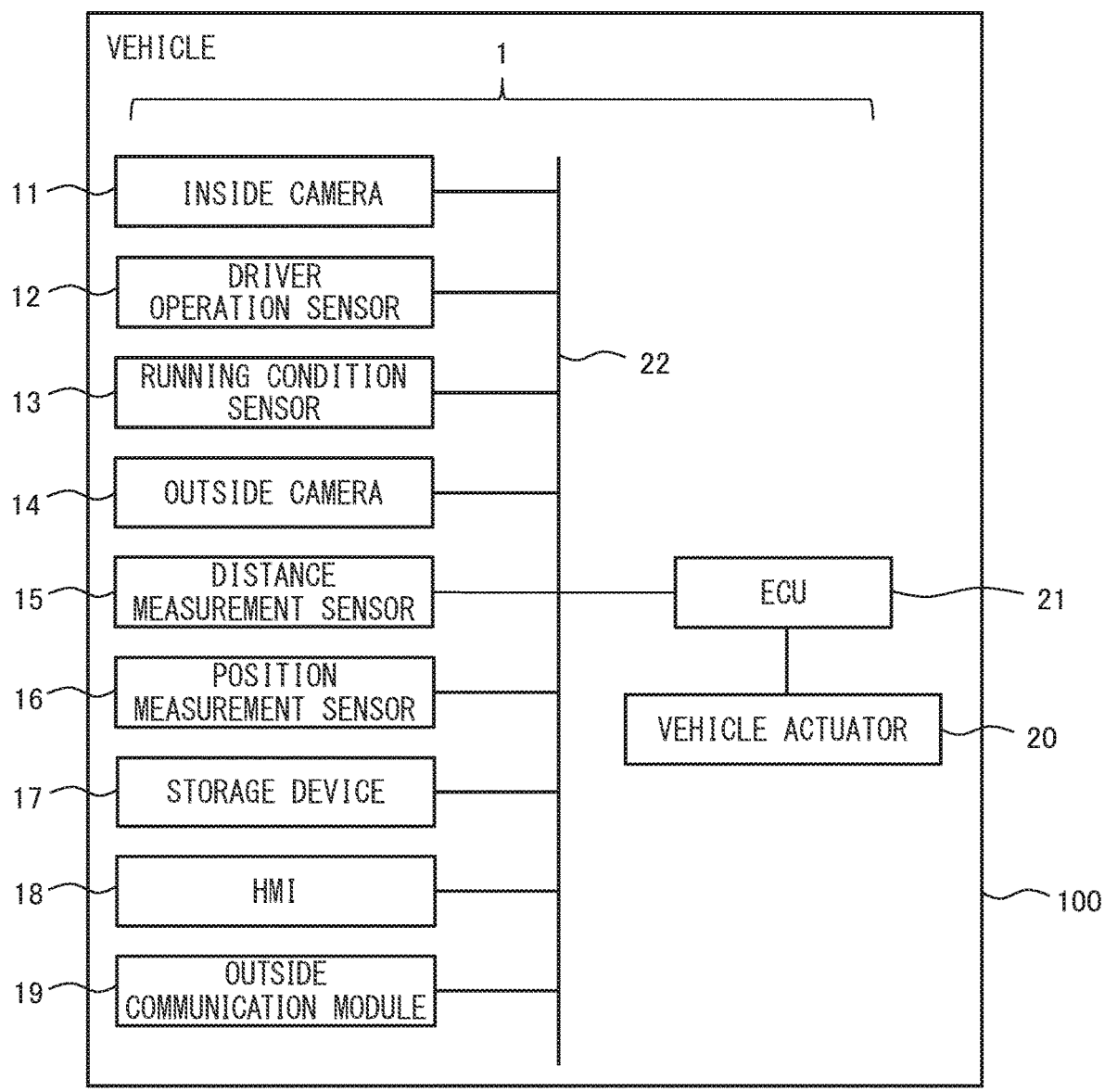
FIG. 1 is a view of the configuration schematically showing a driver assistance system in which a driver assistance control device according to a first embodiment is mounted.

Below, embodiments will be explained in detail while referring to the drawings. Note that, in the following explanation, similar components will be assigned the same reference notations.

First Embodiment

Configuration of Driver Assistance System

FIG. 1 is a view of the configuration schematically showing a driver assistance system in which a driver assistance control device according to a first embodiment is mounted. The driver assistance system 1 is mounted in a vehicle 100 and performs various driver assistance functions. In the present embodiment, the driver assistance system 1 has an inside camera 11, driver operation sensor 12, running condition sensor 13, outside camera 14, distance measurement sensor 15, position measurement sensor 16, storage device 17, human machine interface (below, referred to as an "HMI") 18, outside communication module 19, vehicle actuator 20, and electronic control unit (below, referred to as an "ECU") 21.

However, the driver assistance system 1 need not necessarily have all of these. For example, if having at least one of the inside camera 11, driver operation sensor 12, and running condition sensor 13, the driver assistance system 1 need not have other components. Further, the driver assistance system 1 need not have the position measurement sensor 16 and storage device 17.

The inside camera 11, driver operation sensor 12, running condition sensor 13, outside camera 14, distance measurement sensor 15, position measurement sensor 16, storage device 17, HMI 18, outside communication module 19, and ECU 21 are connected to be able to communicate through an inside network 22. The inside network 22 is a network based on the CAN (Controller Area Network) or other standard. Further, the ECU 21 is connected to the vehicle actuator 20 through a signal wire.

The inside camera 11 is a device capturing an image of the inside of the vehicle. The inside camera 11 has a 2D detectors (CCD, C-MOS, etc.) which is configured with an array of photoelectric conversion elements having sensitivity to visible light, and an image-forming optical system forming an image of a region for capture on the 2D detector. In the present embodiment, the inside camera 11 is arranged in the vehicle so as to face an occupant of the vehicle 100, in particular the face of the driver. Therefore, the inside camera 11 functions as a driver monitoring device monitoring the condition of the driver. The inside camera 11 captures an image of the inside of the vehicle every predetermined image-capturing period so as to generate an image of the inside of the vehicle. The inside camera 11 outputs the generated image to the ECU 21 every time generating an image.

The driver operation sensor 12 is a sensor detecting operation, by the driver, of equipment for controlling operation of the vehicle 100. The equipment for controlling operation of the vehicle 100 includes, for example, an accelerator pedal controlling acceleration of the vehicle 100, a brake pedal controlling braking of the vehicle 100, and a steering wheel controlling steering of the vehicle 100. Therefore, the driver operation sensor 12 detects operation of the accelerator pedal, brake pedal, and steering wheel by the driver. Specifically, the driver operation sensor 12 detects the amounts of depression of the accelerator pedal and brake pedal, and the steering angle of the steering wheel. The driver operation sensor 12 detects operation information by the driver every predetermined period, and outputs the detection results through the inside network 22 to the ECU 21.

The running condition sensor 13 is a sensor detecting the running condition of the vehicle 100. The running condition sensor 13, for example, is an inertia measurement sensor, and detects the speed, acceleration, yaw angle, etc. of the vehicle 100. The running condition sensor 13 outputs the detection results of the running condition of the vehicle through the inside network 22 to the ECU 21.

The outside camera 14 is a device capturing an image of the surroundings of the vehicle. The outside camera 14, similarly to the inside camera 11, has 2D detectors and an image-forming optical system. In the present embodiment, the outside camera 14 is, for example, arranged in the vehicle 100 so as to face the front of the vehicle 100. The outside camera 14 captures an image of the area in front of the vehicle 100 at every predetermined image capturing period (for example 1/30 second to 1/10 second), and generates an image in which the front area is captured. The outside camera 14 outputs a generated image through the inside network 22 to the ECU 21 every time generating an image. Note that, the outside camera 14 may be a single lens camera or a stereo camera. If a stereo camera is used as the outside camera 14, the outside camera 14 functions as the distance measurement sensor 15. The vehicle 100 may also be provided with a plurality of outside cameras different in directions of capture or focal distances. Therefore, the vehicle 100 may have cameras capturing the rear of the vehicle or the sides of the vehicle.

The distance measurement sensor 15 is a sensor measuring the distance to an object present in the surroundings of the vehicle 100. In the present embodiment, the distance measurement sensor 15 can also measure the orientation toward an object present in the surroundings of the vehicle 100. The distance measurement sensor 15 is, for example, a milliwave radar or other radar, or LIDAR. In the present embodiment, the distance measurement sensor 15 measures the distance to an object present in front of the vehicle. The distance measurement sensor 15 outputs the results of measurement of the distance to an object in the surroundings every predetermined period to the ECU 21 through the inside network 22.

The position measurement sensor 16 is a sensor for measuring the self position of the vehicle 100. The position measurement sensor 16 is, for example, a GPS (global positioning system) receiver. The GPS receiver receives GPS signals from a plurality of GPS satellites, and measures the self position of the vehicle 100 based on the received GPS signals. The position measurement sensor 16 outputs the results of measurement of the self position of the vehicle 100 to the ECU 21 through the inside network 22 every predetermined period. Note that, the position measurement sensor 16 may also be a receiver based on another satellite position measurement system if possible to measure the self position of the vehicle 100.

The storage device 17, for example, has a hard disk device or nonvolatile semiconductor memory. The storage device 17 stores the map information. The map information includes information expressing the positions and road signs of predetermined sections of the road for every such section (for example, road lane lines or stop lines). The storage device 17 reads out map information in accordance with a readout demand of map information from the ECU 21, and sends the map information to the ECU through the inside network 22.

The HMI 18 notifies information for notification received from the ECU 21 to the driver of the vehicle 100 through the inside network 22. Therefore, the HMI 14 functions as a notification device notifying information to the driver. Specifically, the HMI 18, for example, has a display device such as a liquid crystal display, speedometer or other meters, warning lights, and speakers. Further, the HMI 18 receives input from the passengers, and sends the received input through the inside network 22 to the ECU 21. Therefore, the HMI 14 functions as an input device receiving input from the passengers or driver. Specifically, the HMI 14 has a touch panel, switches, buttons, and remote controller. The HMI 18, for example, is provided at an instrument panel.

The outside communication module 19 communicates with a device outside the vehicle. The outside communication module 19 is a device communicating wirelessly with a wireless base station, based on a predetermined mobile communication standard. The outside communication module receives the current time, the weather at the surroundings of the vehicle 100, and other information, from an outside server.

The vehicle actuator 20 is an actuator used for control of the operation of the vehicle 100. Specifically, the vehicle actuator 20, for example, has a drive actuator controlling the internal combustion engine or motor for driving the vehicle 100, a brake actuator controlling the brakes braking the vehicle 100, and a steering actuator controlling steering of the vehicle 100. The vehicle actuator 20 controls the acceleration, braking, and steering of the vehicle 100 in accordance with control signals sent from the ECU 21 through signal wires.

Figure 2:
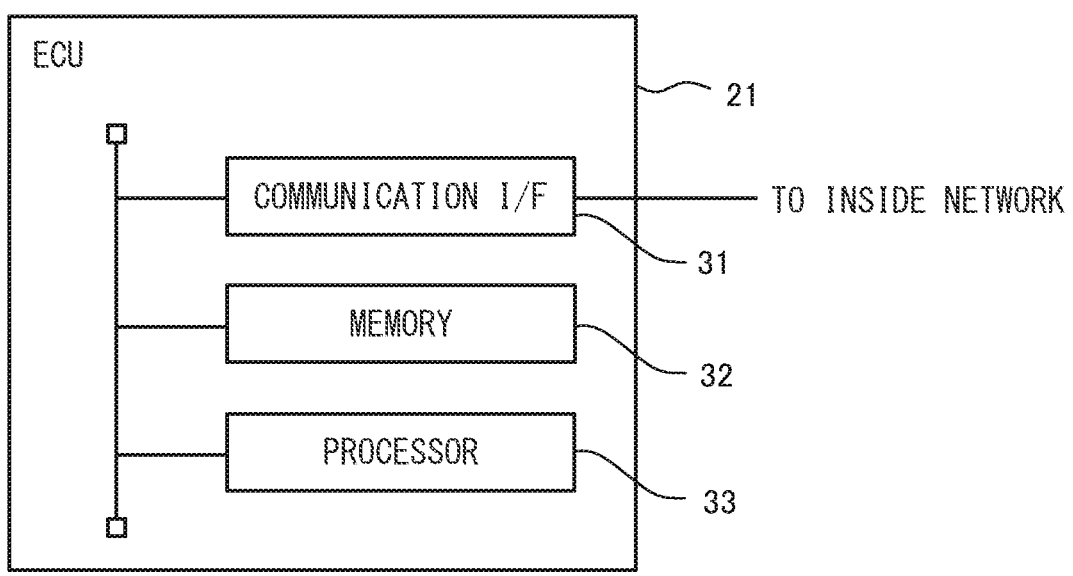
FIG. 2 is a view of a hardware configuration of an ECU of one embodiment of the driver assistance control device.

FIG. 2 is view of the hardware configuration of the ECU 21 of one embodiment of the driver assistance control device. The ECU 21 has a communication interface 31, memory 32, and processor 33. Note that, the communication interface 31, memory 32, and processor 33 may be separate circuits or may be configured as a single integrated circuit.

The communication interface 31 has a communication interface circuit and device interface circuit. The communication interface circuit is a circuit for connecting the ECU 21 to the inside network 22. The device interface circuit is a circuit for outputting a control signal to the vehicle actuator 20.

The communication interface 31 sends an image received from the inside camera 11 and outside camera 14 to the processor 33, each time receiving that image. Further, the communication interface 31 sends operation information of the driver received from the driver operation sensor 12 to the processor 33, each time receiving that operation information. In addition, the communication interface 31 sends the result of measurement of the distance to an object in the surroundings of the vehicle from the distance measurement sensor 15 to the processor 33, each time receiving the results of measurement. Furthermore, the communication interface 31 sends the result of measurement of the self position from the position measurement sensor 16, each time receiving the result of measurement. Further, the communication interface 31 sends a high precision map read from the storage device 17 to the processor 33. In addition, the communication interface 31 sends an input signal of a passenger from the HMI 18 to the processor 33, each time receiving that input signal. Further, the communication interface 31 sends information received from the outside communication module 19 to the processor 33, each time receiving that information. Further, the communication interface 31 sends information for notification received from the ECU 21 to the HMI 18 each time receiving that information. In addition, the communication interface 31 sends a control signal received from the ECU 21 to the vehicle actuator 20, each time receiving that control signal.

The memory 32 is a storage device storing data. The memory 32, for example, has a volatile semiconductor memory and nonvolatile semiconductor memory. The memory 32 stores a program of driver assistance processing to be performed by the processor 33 of the ECU 21. Further, the memory 32 stores images captured by the cameras 11 and 14, operation information by the driver, results of measurement of the distance to an object in the surroundings of the vehicle, results of measurement of the self position, input information of the passengers, different types of data used in the driver assistance processing, etc.

The processor 33 has one or more CPUs (central processing units) and their peripheral circuits. The processor 33 may further have other processing circuits such as logical processing units or numerical processing units. The processor 33 performs processing for control of the vehicle actuator 20 to control the vehicle actuator 20.

Driver Assistance Control

Figure 3:
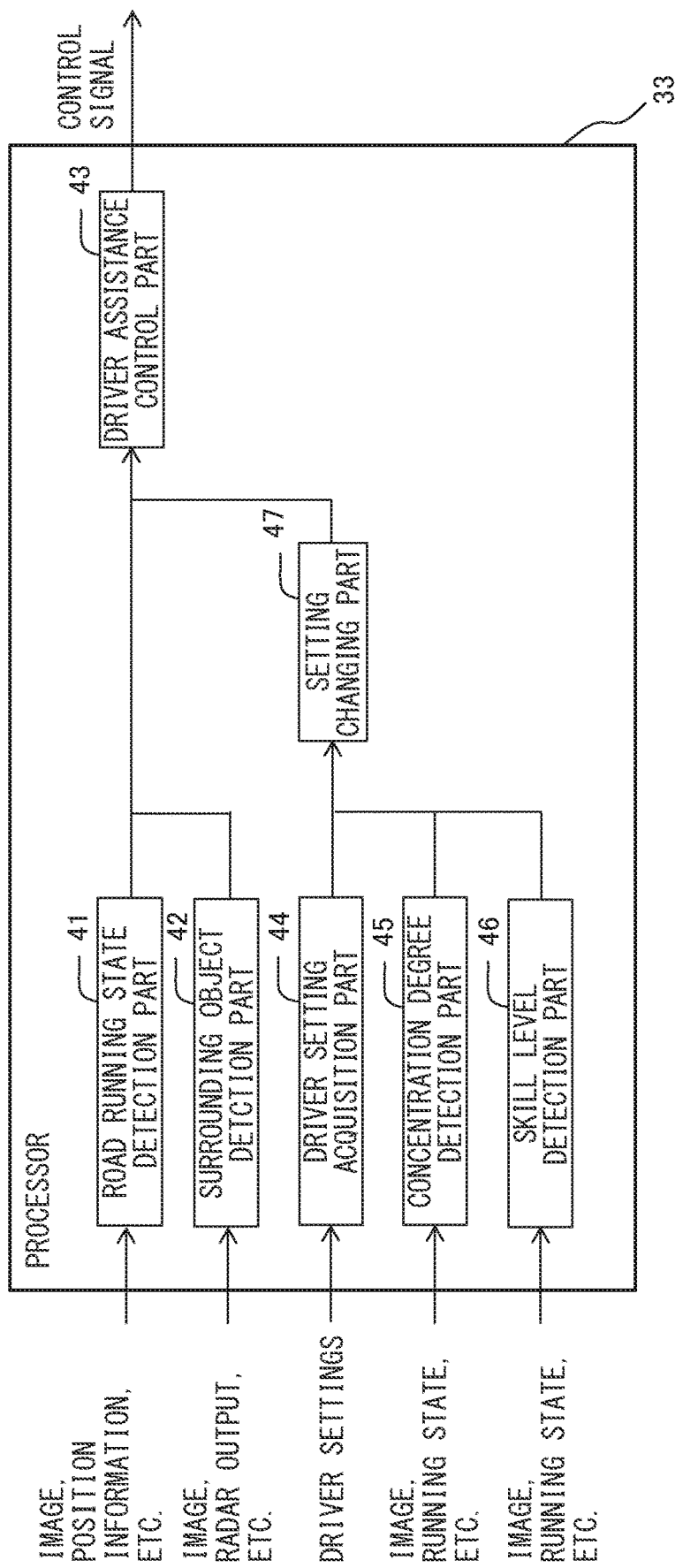
FIG. 3 is a functional block diagram of a processor of an ECU relating to driver assistance processing.

FIG. 3 is a functional block diagram of the processor 33 of the ECU 21 relating to driver assistance processing. The processor 33 has a road running condition detection part 41, surrounding object detection part 42, driver assistance control part 43, driver setting acquisition part 44, concentration degree detection part 45, skill level detection part 46, and setting changing part 47. The functional blocks which the processor 33 has are, for example, functional modules realized by a computer program operating on the processor 33. Alternatively, these functional blocks which the processor 33 has may be dedicated processing circuits provided at the processor 33.

The road running condition detection part 41 detects the state of the vehicle 100 running on the road. For example, images captured by the outside camera 14 are input to the road running condition detection part 41. The road running condition detection part 41 recognizes a road lane line captured in this image, by image recognition processing. As the image recognition processing, a neural network, support vector machine, or other known pattern recognition method is used. In addition, the road running condition detection part 41 calculates the positional relationship between the recognized road lane line and the vehicle 100. Therefore, in the present embodiment, the road running condition detection part 41 detects a position of the vehicle 100 being running on in the width direction of the running lane. The road running condition detection part 41 outputs the road running condition detected in this way to the driver assistance control part 43.

Note that, the road running condition detection part 41 may also recognize a road lane line based on the distance information to an object in the surroundings measured by the distance measurement sensor 15. In this case, the road lane line is recognized by the reflectance of the road lane line to the radio waves differing from those of the surrounding road. Further, the road running condition detection part 41 may also detect the state of the vehicle 100 running on the road, based on the self position of the vehicle 100 measured by the position measurement sensor 16. In this case, the self position of the vehicle 100 measured by the position measurement sensor 16 and the map information stored in the storage device 17 are input to the road running condition detection part 41. The map information includes information of the road lane line. The road running condition detection part 41 detects a position of the vehicle 100 being running on in the width direction of the running lane, based on the map information and the self position of the vehicle 100. Note that, the road running condition detection part 41 may detect the state of the vehicle 100 running on the road, by the above three methods, that is, by the image captured by the outside camera 14, the distance information measured by the distance measurement sensor 15, and the self position and map information of the vehicle 100. Further, the road running condition detection part 41 may detect the state of the vehicle 100 running on the road by another known technique.

The surrounding object detection part 42 detects the types, sizes, positions, etc., of objects present in the surroundings of the vehicle 100. For example, the image captured by the outside camera 14 and the distance to objects in the surroundings measured by the distance measurement sensor 15 are input to the surrounding object detection part 42. The surrounding object detection part 42 recognizes objects in the surroundings of the vehicle 100 captured in this image by image recognition processing. As the image recognition processing, the neural network, support vector machine, or other known pattern recognition method is used. In addition, the distance information to objects in the surroundings measured by the distance measurement sensor 15 is input to the surrounding object detection part 42. The surrounding object detection part 42 uses the result of recognition of objects in the surroundings using the images, and distance information to objects in the surroundings, to detect the types and sizes of objects present in the surroundings of the vehicle 100 and the positions thereof in the surroundings of the vehicle 100, and outputs the results of detection to the driver assistance control part 43.

The driver assistance control part 43 performs the different types of driver assistance functions. The state of the vehicle 100 running on the road is input from the road running condition detection part 41 to the driver assistance control part 43, and the information of the objects present in the surroundings of the vehicle 100 is input from the surrounding object detection part 42 to the driver assistance control part 43. Furthermore, the final setting levels of the assistance levels of the driver assistance functions is input from the later explained setting changing part 47 to the driver assistance control part 43.

The driver assistance control part 43 of the present embodiment can perform a plurality of driver assistance functions. The driver assistance functions performed by the driver assistance control part 43 of the present embodiment include a collision avoidance assistance function, lane departure avoidance assistance function, and adaptive cruise control (ACC) function.

The collision avoidance assistance function is a function of assisting the avoidance of collision with an object in the surroundings of the vehicle 100. In the present embodiment, the collision avoidance assistance function has a warning function issuing a collision warning and a braking function automatically performing braking by the vehicle actuator 20, when it is judged by the driver assistance control part 43 that there is a high possibility of collision with an object in front of the vehicle 100 (direction of advance) (other vehicle or pedestrian or other object with possibility of collision with the vehicle 100).

In the present embodiment, regarding the collision avoidance assistance function, the driver assistance control part 43 outputs a control signal for issuing a warning and for braking, based on the relative speed with an object in front of the vehicle 100 and the distance from this object. The relative speed with an object in front of the vehicle 100 is calculated based on the time-series position information of an object in front of the vehicle 100 detected by the surrounding object detection part 42. The driver assistance control part 43 calculates the speed of the object in the front in the direction of advance of the vehicle 100, based on the time-series positional information, and calculates the relative speed between the object and vehicle 100, based on the calculated speed of the object and the speed of the vehicle 100 detected by the running condition sensor 13.

Specifically, the driver assistance control part 43, for example, outputs a control signal to issue a collision warning from the HMI 18 when a relative speed between an object and the vehicle 100 is equal to or greater than a predetermined reference speed (for example, 10 km/h) and a distance between the object and the vehicle 100 is equal to or less than a warning reference distance. In addition, the driver assistance control part 43, for example, outputs a control signal so as to automatically brake the vehicle 100 by the vehicle actuator 20, when a relative speed between an object and the vehicle 100 is equal to or greater than a predetermined reference speed (for example, 10 km/h) and a distance between the object and the vehicle 100 is equal to or less than a braking reference distance. The warning reference distance is set to a value longer than the braking reference distance. Therefore, the driver assistance control part 43 first outputs a control signal for issuing a warning, when the possibility of collision between the vehicle 100 and an object in the front becomes high, and then outputs a control signal for automatically braking the vehicle 100, when the possibility of collision becomes higher.

In the present embodiment, the driver assistance control part 43 is configured to be able to set the warning reference distance and braking reference distance in stages to a plurality of values (in the present embodiment, three stages) in accordance with the assistance level, relating to the collision avoidance assistance function. At the low assistance level (assistance level 1), the warning reference distance and braking reference distance are set shorter than the other assistance levels. Therefore, a collision avoidance assistance operation is not performed until the vehicle 100 becomes considerably close to an object in the front. Conversely at the highest assistance level (assistance level 3), the warning reference distance and braking reference distance are set higher than other assistance levels. Therefore, even if an object at the front of the vehicle 100 has not approached the vehicle 100 that much, a collision avoidance assistance operation is performed. On the other hand, when the assistance level is 0, the collision avoidance assistance function is stopped. That is, in the collision avoidance assistance function, when the assistance level is 0, the function is rendered a stopped state. As the assistance level rises from 1 to 3, the collision avoidance assistance operation is performed even if the object in front of the vehicle 100 is far away.

Note that, in the present embodiment, the assistance level changes by change of the warning reference distance and braking reference distance. However, for example, the assistance level may be set in a mode different from the above embodiment such as only the warning function being made to operate when the assistance level is set low and both of the warning function and the braking function being made to operate when the assistance level is set high.

The lane departure avoidance assistance function is a function assisting avoidance of departure of the vehicle from a lane in which the vehicle is running. In the present embodiment, the lane departure avoidance assistance function has a warning function issuing a departure warning and a steering function automatically performing steering by the vehicle actuator 20 for avoiding lane departure, when it is judged by the driver assistance control part 43 that there is a high possibility of the vehicle 100 departing from the lane.

In the present embodiment, the driver assistance control part 43 outputs, relating to the lane departure avoidance assistance function, control signals for issuing a warning and for steering, based on the position of the vehicle 100 in the running lane and the orientation of the vehicle 100 with respect to the running lane. The position of the vehicle 100 in the running lane and the orientation of the vehicle 100 with respect to the running lane are found based on the road running condition of the vehicle 100 detected by the road running condition detection part 41. Specifically, the position of the vehicle 100 in the running lane and the orientation of the vehicle 100 with respect to the running lane are found by any method based on the positional relationship between the road lane line of the running lane detected by the road running condition detection part 41 and the vehicle 100.

The driver assistance control part 43, for example, outputs a control signal so as to issue a departure warning from the HMI 18 when the distance between the vehicle 100 and one road lane line is equal to or less than a predetermined warning distance and the orientation of the vehicle 100 with respect to the orientation of the road lane line is equal to or greater than a warning reference angle. In addition, the driver assistance control part 43, for example, outputs a control signal so as to automatically steer the vehicle 100 by the vehicle actuator 20 when the distance between the vehicle 100 and a road lane line is equal to or less than a predetermined steering reference distance and the orientation of the vehicle 100 with respect to the orientation of the road lane line is equal to or greater than the steering reference angle. The warning reference distance is set to a value longer than the steering reference distance, while the warning reference angle is set to an angle larger than the steering reference angle. Therefore, the driver assistance control part 43 first outputs a control signal for issuing a warning when the vehicle 100 is about to depart from the lane, and then outputs a control signal for automatically steering the vehicle 100 when the possibility of lane departure becomes even higher than that.

In the present embodiment, the driver assistance control part 43 is configured to be able to set the warning reference distance and steering reference distance and the warning reference angle and steering reference angle to a plurality of values in stages (in the present embodiment, three stages), in accordance with the assistance level of the lane departure avoidance assistance function, in relation to the lane departure avoidance assistance function. At the low assistance level (assistance level 1), the warning reference distance and steering reference distance are set shorter than the other assistance levels, and the warning reference angle and steering reference angle are set larger than the other assistance levels. Therefore, a lane departure avoidance assistance operation is not performed until the vehicle 100 becomes considerably close to a road lane line at a large angle with respect to the road lane line. Conversely, at the highest assistance level (assistance level 3), the warning reference distance and braking reference distance are set longer than other assistance levels, and the warning reference angle and steering reference angle are set smaller than other assistance levels. Therefore, even if the angle of the vehicle 100 with respect to the road lane line is small and the vehicle 100 is not that close to the road lane line, the lane departure avoidance assistance operation is performed. On the other hand, when the assistance level is 0, the lane departure avoidance assistance function is stopped. That is, in the lane departure avoidance assistance function, when the assistance level is 0, the function is rendered a stopped state. As the assistance level rises from 1 to 3, the collision avoidance assistance operation is performed even if the distance of the vehicle 100 to the road lane line is long and further even if the angle with respect to the road lane line is small.

Note that, in the present embodiment, the assistance level changes by change of the warning reference distance, steering reference distance, warning reference angle, and steering reference distance. However, for example, the assistance level may be set in a mode different from the above embodiment such as only the warning function being made to operate when the assistance level is set low and both of the warning function and the steering function being made to operate when the assistance level is set high.

The ACC function is a function for adjusting the speed of the vehicle so as to follow the preceding vehicle at a certain distance. The speed of the vehicle is adjusted to follow the preceding vehicle by a certain distance. In the present embodiment, regarding the ACC function, the driver assistance control part 43 outputs a control signal for acceleration and braking, based on the distance from the preceding vehicle in front of the vehicle 100. The distance between the vehicle 100 and the preceding vehicle is calculated based on the positional information of an object in front of the vehicle 100 detected by the surrounding object detection part 42.

Specifically, the driver assistance control part 43, for example, outputs a control signal so as to brake the vehicle 100 when the distance between the preceding vehicle and the vehicle 100 is shorter than a predetermined reference distance. On the other hand, the driver assistance control part 43 outputs a control signal to make the vehicle 100 accelerate when the distance between the preceding vehicle and the vehicle 100 is longer than a reference distance. However, in this case as well, the driver assistance control part 43 does not allow the vehicle 100 to accelerate more when the speed of the vehicle 100 is equal to or greater than a limit speed set in advance by the driver or a passenger.

In the present embodiment, regarding the ACC function, the driver assistance control part 43 is configured so as to be able to set the reference distance to a plurality of values in stages (in the present embodiment, three stages) in accordance with the assistance level. At a low assistance level (assistance level 1), the reference distance is set shorter than the other assistance levels (for example, 30 m). Therefore, the distance between the vehicle 100 and the preceding vehicle is maintained in a relatively short state. Conversely, at the highest assistance level (assistance level 3), the reference distance is set longer than the other assistance levels (for example, 50 m). Therefore, the distance between the vehicle 100 and the preceding vehicle is maintained in a relatively long state. On the other hand, when the assistance level is 0, the ACC function is stopped. That is, in the ACC function, when the assistance level is 0, the function is rendered the stopped state. As the assistance level rises from 1 to 3, the distance between the vehicle 100 and the preceding vehicle is set longer.

Note that, the driver assistance control part 43 may also be able to perform driver assistance functions other than the above driver assistance function. Such a driver assistance function includes, for example, a dead angle monitoring function issuing a warning when there is another vehicle present at a position becoming a dead angle to the driver.

These driver assistance functions may be roughly divided into safety system driver assistance functions and auxiliary system driver assistance functions. The safety system driver assistance functions are driver assistance functions enhancing the safety of the vehicle 100 by execution. Therefore, the safety system driver assistance functions include a collision avoidance assistance function for avoiding collision with an object in the surroundings, a departure avoidance assistance function for avoiding unintentional departure of a vehicle 100 from a lane, and a dead angle monitoring function for providing information on a position becoming a dead angle to a driver. On the other hand, the auxiliary system driver assistance functions are driver assistance functions assisting driving by the driver. Therefore, the auxiliary system driver assistance functions include the ACC function of assisting operation of acceleration and deceleration by the driver.

Setting of Driver Assistance Functions

In this regard, the driver assistance control part 43 performs various driver assistance functions based on the assistance levels of the driver assistance functions. The assistance levels of the driver assistance functions are basically set by the driver through the HMI. However, in the present embodiment, the assistance levels of the driver assistance functions set by the driver are changed in accordance with the degree of concentration of the driver with respect to driving of the vehicle, etc. Such a change of settings of assistance levels by the driver is performed by driver setting acquisition part 44, concentration degree detection part 45, skill level detection part 46, and setting changing part 47.

The driver setting acquisition part 44 acquires the assistance levels of the driver assistance functions set by the driver. The driver setting acquisition part 44 acquires the assistance levels set by the driver from the HMI 18 through the inside network 22.

Here, in the present embodiment, the HMI 18 is provided with a switch for receiving input of the assistance level of the driver for each driver assistance function. Therefore, the driver uses this switch to input the assistance level desired for each driver assistance function. Regarding the collision avoidance assistance function, the HMI 18 is provided with a switch switching the collision avoidance assistance function between a stopped state (OFF. assistance level 0) and an operating state (ON), and a switch for selecting the assistance level when the collision avoidance assistance function is set to the operating state, among the levels 1 to 3. Similarly, regarding the lane departure avoidance assistance function, the HMI 18 is provided with a switch switching the lane departure avoidance assistance function between a stopped state (OFF. assistance level 0) and an operating state (ON), and a switch for selecting the assistance level when the lane departure avoidance assistance function is set to the operating state, among the levels 1 to 3. In addition, regarding the ACC function, the HMI 18 is provided with a switch switching the ACC function between a stopped state (OFF. assistance level 0) and an operating state (ON), and a switch for selecting the assistance level when the ACC function is set to the operating state, among the levels 1 to 3.

The driver setting acquisition part 44 acquires the assistance level set by the driver by the switches of the HMI 18 in this way. Further, the driver setting acquisition part 44 outputs the acquired assistance level to the setting changing part 47.

The concentration degree detection part 45 detects the value of a parameter relating to the degree of concentration of the driver with respect to driving of the vehicle. In the present embodiment, as this parameter, the degree of awakeness of the driver is used. The concentration degree detection part 45 uses image recognition processing to detect a degree of eye opening of the driver, a direction of a line of sight, a speed of blinking, etc., from the image of the face of the driver captured by the inside camera 11. As the image recognition processing, a neural network, support vector machine, or other known pattern recognition method may be used. In the present embodiment, the concentration degree detection part 45 judges that the degree of awakeness of the driver is higher as the degree of eye opening of driver is greater, as the speed of movement in the direction of the line of sight is faster, and as the blinking is faster. The lower the degree of awakeness of the driver, the more it is believed the driver cannot concentrate with respect to driving of the vehicle due to drowsiness. The concentration degree detection part 45 outputs the thus calculated degree of awakeness of the driver to the setting changing part 47.

Further, as the parameter relating to the degree of concentration of the driver with respect to driving of the vehicle, the degree of wobbling of the vehicle 100 may also be used. The degree of wobbling of the vehicle 100 is judged based on the frequency of the driver steering to the left or right. The higher the frequency of steering to the left and right, the higher the degree of wobbling is judged. Alternatively, the degree of wobbling of the vehicle 100 is judged high when the state of the driver not steering continues for a certain time, then the steering angle is rapidly changed at equal to or greater than a predetermined angle. The higher the degree of wobbling of the vehicle 100, the more distracted the attention of the driver to driving and the less the concentration with respect to driving of the vehicle.

In this case, the concentration degree detection part 45 calculates the frequency of the driver steering to the left or right, based on operation of the steering wheel detected by the driver operation sensor 12, or based on the change of the yaw angle detected by the running condition sensor 13. Alternatively, the concentration degree detection part 45 detects the presence of a sharp change of the steering angle of equal to or greater than a predetermined angle, based on operation of the steering wheel detected by the driver operation sensor 12, or based on the change of the yaw angle detected by the running condition sensor 13. The concentration degree detection part 45 outputs the thus calculated frequency of the driver steering to the left or right or the rapid change of the steering angle as the degree of wobbling of the vehicle 100 to the setting changing part 47.

Alternatively, as a parameter relating to the degree of concentration of the driver with respect to the driving of the vehicle, the degree of change of acceleration of the vehicle 100 may also be used. The degree of change of acceleration of the vehicle 100 is judged based on the frequency of the driver greatly operating the accelerator pedal or brake pedal. The higher the frequency of greatly operating the accelerator pedal or brake pedal, the more it is believed that unnecessary rapid acceleration or rapid deceleration occurs, and the higher the frequency of the driver accelerating or decelerating, that is, the degree of change of acceleration. The higher the degree of change of acceleration of the vehicle 100, the more it is believed that driver becomes distracted in attention to driving and cannot concentrate on driving of the vehicle.

In this case, the concentration degree detection part 45 calculates the frequency of the driver accelerating or decelerating, based on the operation of the accelerator pedal and brake pedal detected by the driver operation sensor 12, or based on the change of acceleration detected by the running condition sensor 13. The concentration degree detection part 45 outputs the thus calculated frequency of the driver accelerating or decelerating, as the degree of change of acceleration of the vehicle 100, to the setting changing part 47.

Note that, in the present embodiment, the degree of concentration of the driver with respect to driving of the vehicle is judged based on at least one of the degree of awakeness of the driver, the degree of wobbling of the vehicle 100, and the degree of acceleration or deceleration of the vehicle 100. However, the degree of concentration of the driver with respect to driving of the vehicle may also be judged based on the value of another parameter relating to the degree of concentration of the driver with respect to driving of the vehicle.

The skill level detection part 46 detects the skill level of the driver relating to driving of the vehicle. In the present embodiment, the skill level is calculated based on the degree of wobbling and degree of change of acceleration when the driver has driven for a certain long degree of time (for example, tens of hours).

Here, even when the driver has concentrated on driving of the vehicle, there is a high possibility of a driver with a low skill level performing unnecessary steering or unnecessary acceleration or deceleration. Therefore, a driver with an average high degree of wobbling and average high degree of change of acceleration over a long time period may be considered to be low in skill level. Therefore, in the present embodiment, the skill level detection part 46 detects the degree of wobbling and degree of change of acceleration over a long time period when different drivers are driving, and calculates the skill level as a lower skill level of the driver as the average detected degree of wobbling and the average detected degree of change of acceleration are higher.

Note that, the skill level may also be calculated based on running conditions of the vehicle 100 other than the above-mentioned degree of wobbling or degree of change of acceleration. For example, the skill level may be calculated based on the frequency of the vehicle 100 running away from the center of the lane by equal to or greater than a certain distance, etc.

The setting changing part 47 automatically changes the settings of the driver assistance functions, based on the value of a parameter relating to the degree of concentration detected by the concentration degree detection part 45. In the present embodiment, the setting changing part 47 changes the assistance levels of the driver assistance functions from the levels set by the driver. The assistance levels set by the driver is input from the driver setting acquisition part 44 to the setting changing part 47. Further, the degree of awakeness of the driver is input from the concentration degree detection part 45 to the setting changing part 47. Furthermore, the skill level of the driver relating to driving of the vehicle is input from the skill level detection part 46 to the setting changing part 47. Further, the setting changing part 47 outputs the final setting levels of the assistance levels for the driver assistance functions to the driver assistance control part 43.

In the present embodiment, the setting changing part 47 raises the assistance levels of the safety system driver assistance functions from the levels set by the driver, when the degree of awakeness of the driver falls and becomes equal to or less than a second reference value. Specifically, in the present embodiment, the setting changing part 47 raises the assistance levels of the collision avoidance assistance function and the lane departure avoidance assistance function, when the degree of awakeness of the driver becomes equal to or less than the second reference value. In addition, the setting changing part 47 raises the assistance levels of the auxiliary system driver assistance functions from the levels set by the driver, when the degree of awakeness of the driver falls and becomes equal to or less than a first reference value. Specifically, in the present embodiment, the setting changing part 47 raises the assistance level of the ACC function, when the degree of awakeness of the driver becomes equal to or less than the first reference value. The second reference value is a value larger than the first reference value, and accordingly is a value showing that the degree of concentration of the driver with respect to driving of the vehicle is higher compared with the first reference value. Therefore, in the present embodiment, if the degree of awakeness gradually falls from the high state (that is, if the degree of concentration becomes low), first, the assistance levels of the safety system driver assistance functions are raised, then the assistance levels of the auxiliary system driver assistance functions are raised.

If the assistance levels are divided into a large number of stages, the assistance levels may be raised by just one stage from the levels set by the driver, or may be raised by several stages. For example, when the assistance level set by the driver for the collision avoidance assistance function is 1, the assistance level output when the degree of awakeness of the driver becomes the second reference value is set to 2 or 3.

Note that, in the present embodiment, the assistance levels of the collision avoidance assistance function and the lane departure avoidance assistance function are raised, when the degree of awakeness of the driver becomes equal to or less than the second reference value. However, the second reference value for raising the assistance level of the collision avoidance assistance function and the second reference value for raising the assistance level of the lane departure avoidance assistance function may also be different values. However, in this case as well, the second reference value for raising the assistance level of the collision avoidance assistance function and the second reference value for raising the assistance level of the lane departure avoidance assistance function are both set to values larger than the first reference value.

Figure 4:
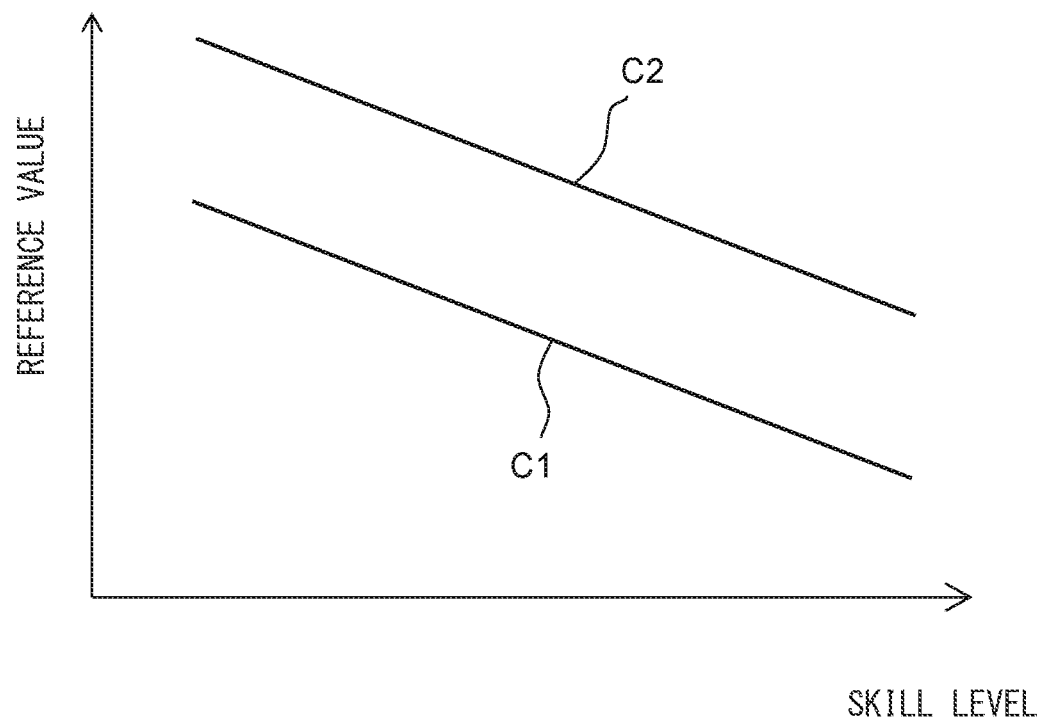
FIG. 4 is a view showing a relationship between a skill level, and a first reference value and second reference value.

Further, in the present embodiment, the setting changing part 47 changes the first reference value and the second reference value in accordance with the skill level of the driver relating to driving of the vehicle. FIG. 4 is a view showing the relationship between the skill level and the first reference value C1 and the second reference value C2. As shown in FIG. 4, the setting changing part 47 sets the first reference value C1 and the second reference value C2 lower as the skill level of the driver detected by the skill level detection part 46 becomes higher. Therefore, the setting changing part 47 raises the assistance levels of the driver assistance functions after the degree of concentration of the driver with respect to driving of the vehicle becomes lower, as the skill level of the driver detected by the skill level detection part 46 is higher.

Note that, the setting changing part 47 may also change only one of the first reference value and the second reference value, in accordance with the skill level of the driver. In this case, the other of the first reference value and the second reference value does not change, in accordance with the skill level of the driver. Therefore, the setting changing part 47 can be said to modify at least one of the first reference value and the second reference value so that the settings of the driver assistance functions are changed when the degree of concentration is lower, as the skill level of the driver is higher.

Figure 5:
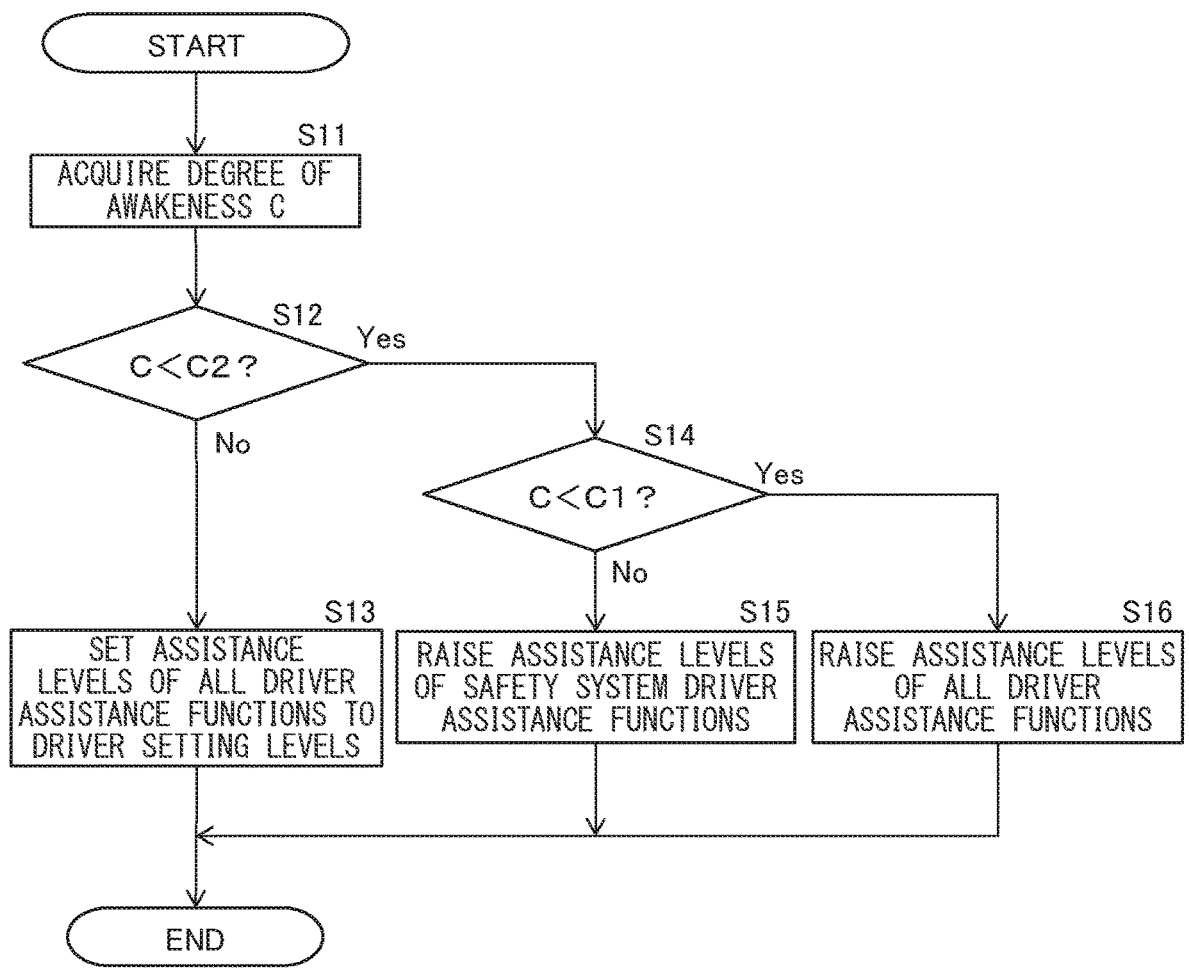
FIG. 5 is a flow chart of processing for setting an assistance level performed in a setting changing part.

FIG. 5 is a flow chart of the processing for setting the assistance levels performed in the setting changing part 47. The illustrated processing is performed every certain time interval.

As shown in FIG. 5, the setting changing part 47 first acquires, from the concentration degree detection part 45, the degree of awakeness C of the driver (that is, the degree of concentration of the driver with respect to driving of the vehicle) (step S11). Next, the setting changing part 47 judges if the acquired degree of awakeness C is smaller than the second reference value C2 (step S12). If at step S12 it is judged that the acquired degree of awakeness C is equal to or greater than the second reference value C2 (C≥C2), the setting changing part 47 sets the assistance levels for all of the driver assistance functions to the levels set by the driver (step S13). Therefore, in the present embodiment, when the acquired degree of awakeness C is lower than the second reference value C2 or the first reference value C1 and, at the later explained steps S15 and S16, the assistance levels of the driver assistance functions are raised once, and then the degree of awakeness C becomes larger than the second reference value C2, the assistance levels of the driver assistance functions are returned to the levels set by the driver.

On the other hand, if at step S12 it is judged that the acquired degree of awakeness C is smaller than the second reference value C2 (C<C2), the setting changing part 47 judges if the acquired degree of awakeness C is smaller than the first reference value C1 (step S14). If at step S14 it is judged that the acquired degree of awakeness C is equal to or greater than the first reference value C1 (C≥C1), the setting changing part 47 makes the assistance levels of the safety system driver assistance functions rise (step S15). Therefore, when the assistance level of the collision avoidance assistance function set by the driver is 1, this assistance level is changed to 2 or 3. However, when the assistance level of the collision avoidance assistance function set by the driver is the maximum value (in the present embodiment, 3), it is not possible to raise the level any further, therefore the assistance level is maintained as is as the level set by the driver. On the other hand, the assistance levels of the auxiliary system are maintained at the levels set by the driver. If at step S14 it is judged that the acquired degree of awakeness C is smaller than the first reference value C1 (C<C1), the setting changing part 47 makes the assistance levels of all of the driver assistance functions rise (step S16).

Figure 6:
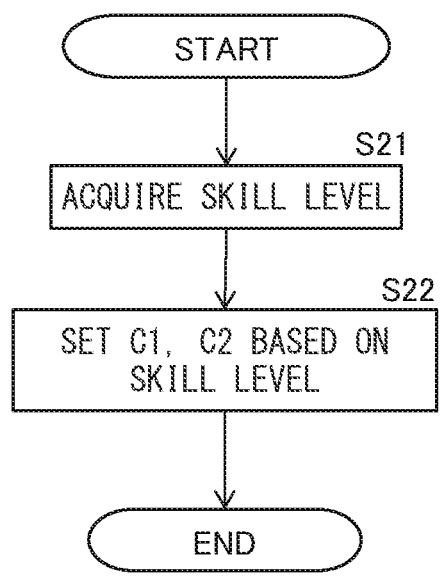
FIG. 6 is a flow chart of processing for setting a first reference value and second reference value relating to a degree of awakeness.

FIG. 6 is a flow chart of the processing for setting the first reference value C1 and the second reference value C2 relating to the degree of awakeness. The illustrated processing is performed every certain time interval.

As shown in FIG. 6, the setting changing part 47 acquires the skill level of the driver from the skill level detection part 46 (step S21). Next, the setting changing part 47 sets the first reference value C1 and the second reference value C2, based on the acquired skill level, by using the map such as shown in FIG. 4 (step S22). The thus set first reference value C1 and second reference value C2 are used in steps S12 and S14 of FIG. 5.

Note that, in the setting changing part 47 of the present embodiment, the assistance levels of the driver assistance functions are changed only once. However, the assistance levels of the driver assistance functions may also be changed a plurality of times. In this case as well, the first change of the assistance levels of the safety system driver assistance functions is performed when the degree of awakeness is the second reference value, and the first change of the assistance levels of the auxiliary system driver assistance functions is performed when the degree of awakeness is the first reference value. Further, as explained above, as a parameter relating to the degree of concentration, another parameter different from the degree of awakeness may also be used.

Further, in the above embodiment, raising the assistance levels of the driver assistance functions includes changing the assistance levels from 0 to 1, that is, switching the driver assistance functions from the stopped state to the operating state. However, it is also possible not to switch the assistance levels from 0 to 1 for some of the driver assistance functions even if the degree of awakeness reaches the first reference value C1 or the second reference value C2. Specifically, for example, the assistance level need not be switched from 0 to 1 for the lane departure avoidance assistance function (only function for steering) and the ACC function, even if the degree of awakeness reaches the first reference value C1 or the second reference value C2.

Therefore, summarizing the above, in the present embodiment, when the degree of concentration of the driver with respect to driving of the vehicle becomes low and the value of a parameter becomes a first value, the setting changing part 47 automatically changes the settings of the safety system driver assistance functions so that the assistance levels become higher than the levels set by the driver. In addition, when the degree of concentration of the driver with respect to driving of the vehicle becomes low and the value of the parameter becomes a second value, the setting changing part 47 automatically changes the settings of second driver assistance functions including at least another driver assistance function among the auxiliary system driver assistance functions so that the assistance levels become higher than the levels set by the driver. Further, in the present embodiment, when after the assistance levels of the driver assistance functions are automatically changed, the value of the parameter changes to a value showing a higher degree of concentration of the driver with respect to driving of the vehicle than the first value or the second value, the setting changing part 47 returns the assistance levels of the driver assistance functions to the levels before the automatic change.

Advantageous Effects

If the degree of concentration of the driver with respect to driving of the vehicle becomes low, the ability of the driver to drive the vehicle falls. Therefore, to maintain suitable driving of the vehicle, when the degree of concentration of the driver with respect to driving of the vehicle falls, it is necessary to raise the assistance levels by the driver assistance functions and make up for the drop in the ability of the driver to drive the vehicle. In the driver assistance system of the present embodiment, the assistance level is automatically changed at a different timing for each driver assistance function in accordance with the degree of concentration of driver with respect to driving of the vehicle. Therefore, according to the present embodiment, it is possible to suitably assist a driver in accordance with the degree of concentration of the driver.

Further, in the driver assistance system of the present embodiment, the assistance levels of the safety system driver assistance functions are raised before the assistance levels of the auxiliary system driver assistance functions. By raising the assistance levels of the safety system driver assistance functions earlier in this way, it is possible to keep the safety of the vehicle from falling when the degree of concentration of the driver with respect to driving of the vehicle becomes lower.

Modifications

Next, referring to FIGS. 7 and 8, modifications of the driver assistance system according to the first embodiment will be explained.

In this regard, sometimes automatic change of the assistance levels of the driver assistance functions runs against the intention of the driver. In such a case, the driver manually changes the settings of the assistance levels of the driver assistance functions after the assistance levels of the driver assistance functions are automatically switched. In this case, it is not necessary to automatically change the assistance levels of the driver assistance functions after the change.

Therefore, in one modification, when the user manually changes the settings of the assistance levels of the driver assistance functions after the assistance levels of the driver assistance functions are automatically changed, the setting changing part 47 does not automatically change the assistance levels of the driver assistance functions maintained them as is as the levels set by the driver, even if the degree of awakeness falls more than the first reference value or the second reference value after the automatic change.

Figure 7:
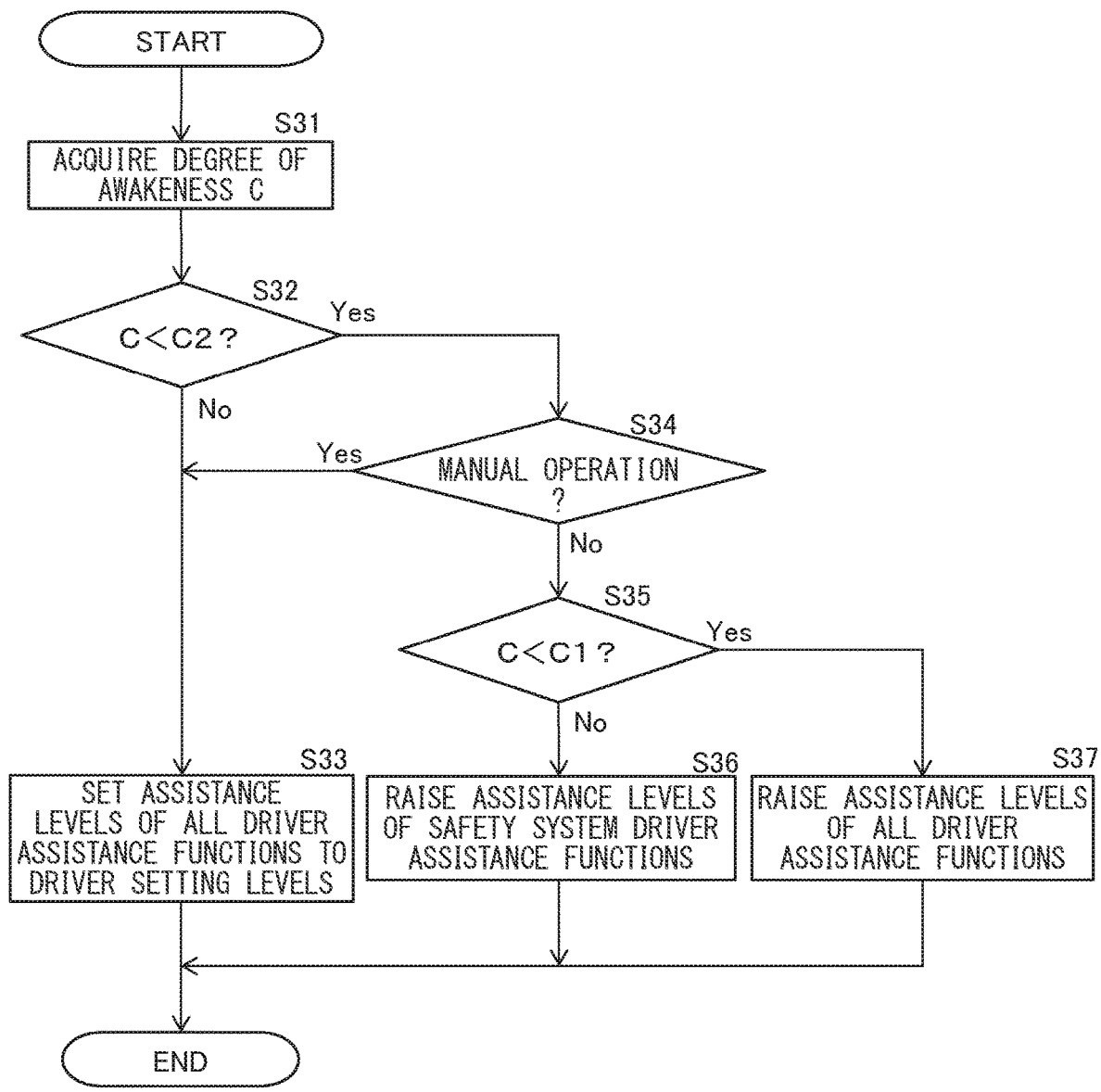
FIG. 7 is a flow chart of processing for setting an assistance level according to one modification.

FIG. 7 is a flow chart of the processing for setting the assistance levels according to the present modification. The illustrated processing is performed every certain time interval. Note that, steps S31 to S33 and S35 to S37 in FIG. 7 are respectively similar to steps S11 to S13 and S14 to S16 in FIG. 5, therefore explanations thereof will be omitted.

As shown in FIG. 7, if at step S32 it is judged that the acquired degree of awakeness C is smaller than the second reference value C2 (C<C2), the setting changing part 47 judges whether the driver manually changed the settings of the assistance levels of the driver assistance functions after the degree of awakeness C became smaller than the second reference value C2 (step S34). Whether the driver manually changed the settings of the assistance levels of the driver assistance functions is judged based on the output of the driver setting acquisition part 44. If it is judged that the driver manually changed the settings of the assistance levels, the setting changing part 47 sets the assistance levels for all of the driver assistance functions to the levels set by the driver (step S33). On the other hand, if it is judged that the driver did not manually change the settings of the assistance level, the setting changing part 47 judges if the acquired degree of awakeness C is smaller than the first reference value C1 (step S35).

Further, in the above embodiment, if the degree of awakeness C becomes equal to or greater than the second reference value after the assistance levels of the driver assistance functions are automatically changed, the setting changing part 47 returns the assistance levels for all of the driver assistance functions to the levels set by the driver. However, for the collision avoidance assistance function, if automatically set to the operating state and then returned to the stopped state, there is a possibility of the settings being released before the driver noticing it. The presence of operation of the collision avoidance assistance function leads to safety of driving of the vehicle, therefore the settings should not be released before the driver notices it.

Therefore, in one modification, after automatically changing the setting of the collision avoidance assistance function from the stopped state to the operating state, the setting changing part 47 is configured to not change the setting of the collision avoidance assistance function from the operating state to the stopped state, even if the degree of awakeness C changes to the first reference value or the second reference value.

Figure 8:
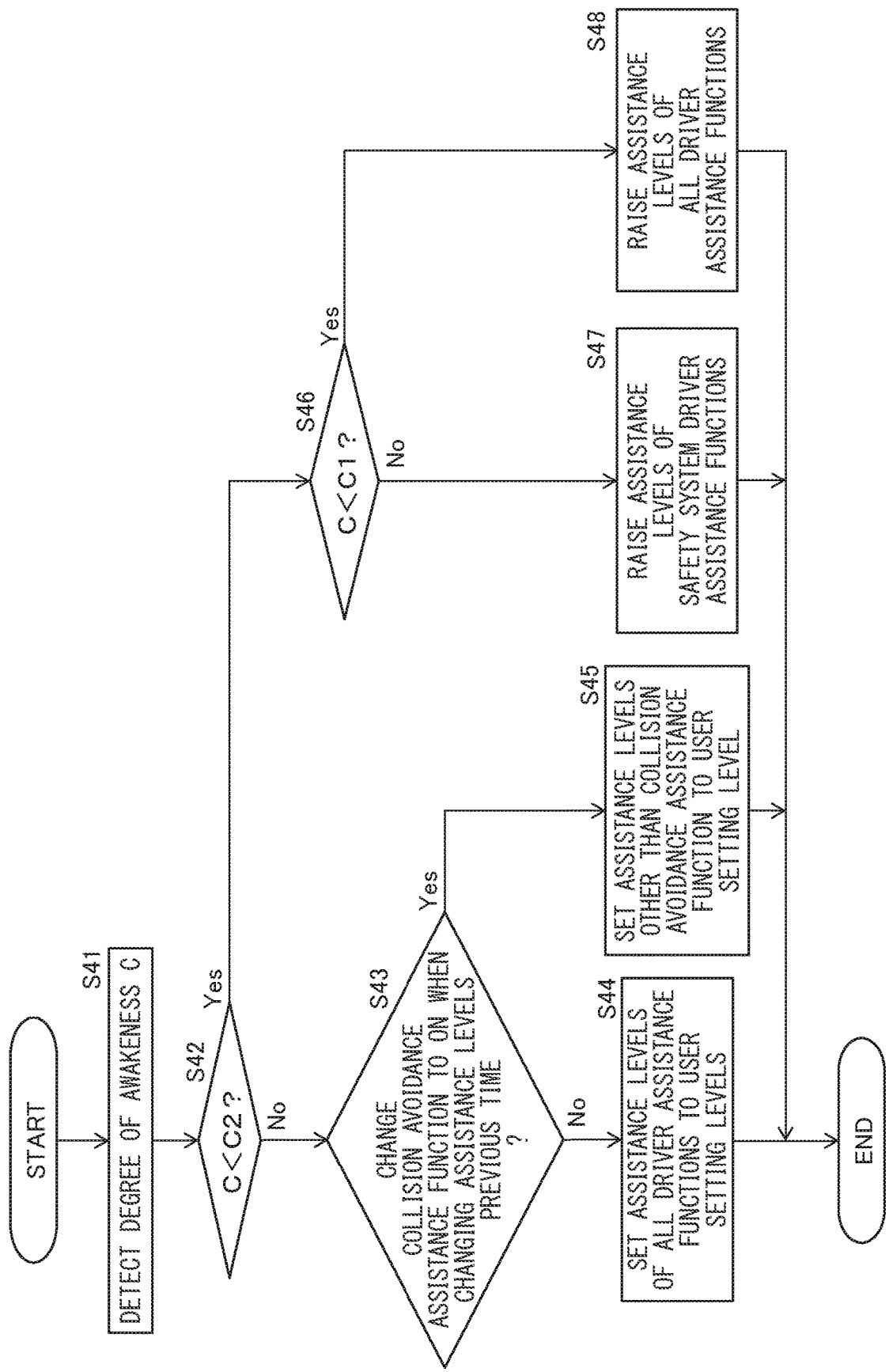
FIG. 8 is a flow chart of processing for setting an assistance level according to one modification.

FIG. 8 is a flow chart of processing for setting the assistance levels according to the present modification. The illustrated processing is performed every certain time interval. Note that, steps S41, S42, and S46 to S48 in FIG. 8 are respectively similar to steps S11, S12, and S14 to S16 in FIG. 5, therefore explanations will be omitted.

If at step S42 it is judged that the acquired degree of awakeness C is equal to or greater than the second reference value C2 (C≥C2), the setting changing part 47 judges whether the collision avoidance assistance function was changed from the stopped state to the operating state when the assistance level was automatically changed by the setting changing part 47 in the previous time (step S43). If at step S43 it is judged that the collision avoidance assistance function was not changed from the stopped state to the operating state when the assistance level was automatically changed in the previous time, the setting changing part 47 sets the assistance levels for all driver assistance functions to the levels set by the driver (step S44). On the other hand, if at step S43 it is judged that the collision avoidance assistance function was changed from the stopped state to the operating state when the assistance level was automatically changed in the previous time, the setting changing part 47 sets the assistance levels for all of the driver assistance functions other than the collision avoidance assistance function to the levels set by the driver (step S45). As a result, the collision avoidance assistance function is maintained as is in the operating state.

Second Embodiment

Next, referring to FIG. 9, a driver assistance system according to a second embodiment will be explained. Below, the points of difference from the driver assistance system according to the first embodiment will be focused on in this explanation.

In the present embodiment as well, when the degree of awakeness of the driver falls and becomes equal to or less than the second reference value, the setting changing part 47 raises the assistance levels of the safety system driver assistance functions from the levels set by the driver. Specifically, in the present embodiment as well, when the degree of awakeness of the driver becomes equal to or less than the second reference value, the setting changing part 47 raises the assistance levels of the collision avoidance assistance function and lane departure avoidance assistance function. In addition, when the degree of awakeness of the driver falls and becomes equal to or less than the first reference value, the setting changing part 47 raises the assistance levels of the auxiliary system driver assistance functions from the levels set by the driver. Specifically, in the present embodiment as well, when the degree of awakeness of the driver becomes equal to or less than the first reference value, the setting changing part 47 raises the assistance level of the ACC function. However, in the present embodiment, the second reference value is a value smaller than the first reference value. Accordingly, it is a value showing that the degree of concentration of the driver with respect to driving of the vehicle is lower than the first reference value. Therefore, in the present embodiment, if the degree of awakeness gradually falls from a high state (that is, if the degree of concentration falls), first, the assistance levels of the auxiliary system driver assistance functions are raised, then the assistance levels of the safety system driver assistance functions are raised.

Figure 9:
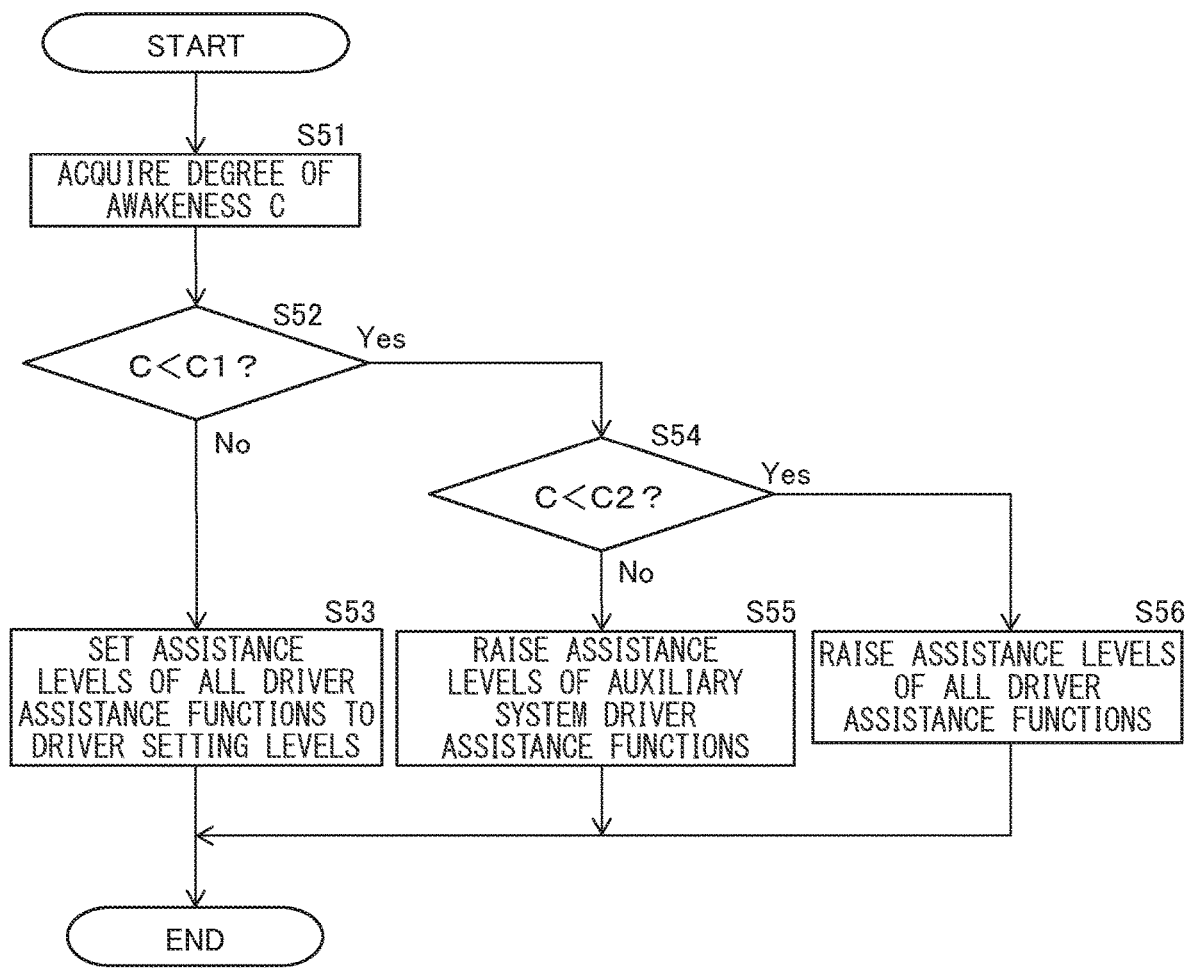
FIG. 9 is a flow chart of processing for setting an assistance level performed in a setting changing part.

FIG. 9 is a flow chart of the processing for setting the assistance levels performed at the setting changing part 47. The illustrated processing is performed every certain time interval.

As shown in FIG. 9, the setting changing part 47 first acquires the degree of awakeness of the driver C from the concentration degree detection part 45 (step S51). Next, the setting changing part 47 judges if the acquired degree of awakeness C is smaller than the first reference value C1 (step S52). If at step S52 it is judged that the acquired degree of awakeness C is equal to or greater than the first reference value C1 (C≥C1), the setting changing part 47 sets the assistance levels of all of the driver assistance functions to the levels set by the driver (step S53).

On the other hand, if at step S52 it is judged that the acquired degree of awakeness C is smaller than a second reference value C2 (C<C2), the setting changing part 47 judges if the acquired degree of awakeness C is smaller than a second reference value C2 (step S54). If at step S54 it is judged that the acquired degree of awakeness C is equal to or greater than the second reference value C2 (C≥C2), the setting changing part 47 makes the assistance levels of the auxiliary system driver assistance functions rise (step S55). Therefore, when the assistance level of the ACC function set by the driver is 1, this assistance level is changed to 2 or 3. However, when the assistance level of the ACC function set by the driver is the maximum value (in the present embodiment, 3), the assistance level cannot be raised more, therefore the level is maintained at the assistance level set by the driver. On the other hand, the assistance levels of the safety system are maintained at the levels set by the driver. If at step S54 it is judged that the acquired degree of awakeness C is smaller than the second reference value C2 (C<C2), the setting changing part 47 makes the assistance levels of all of the driver assistance functions rise (step S56).

In the driver assistance system of the present embodiment, the assistance levels of the auxiliary system driver assistance functions are raised before the assistance levels of the safety system driver assistance functions. Here, for example, taking the ACC function as an example, if the assistance level rises, the distance from the preceding vehicle 100 becomes greater, therefore the driver easily notices that the assistance level has risen. That is, if the assistance levels of the auxiliary system driver assistance functions rise, the driver easily recognizes that the assistance levels have risen and accordingly the driver can be made to understand the current situation of driver assistance.

Note that, summarizing the control of the setting changing part 47 in the first embodiment and the second embodiment, the setting changing part 47 automatically changes the settings of first driver assistance functions including at least one of the plurality of driver assistance functions so that the assistance level becomes higher than the level set by the driver when the degree of concentration of the driver with respect to driving of the vehicle becomes lower and the value of the parameter representing the degree of concentration becomes a first value, and automatically changes the settings of second driver assistance functions including at least one other driver assistance function of the plurality of driver assistance functions so that the assistance level becomes higher than the level set by the driver when the degree of concentration of the driver with respect to driving of the vehicle becomes lower and the value of the parameter becomes a second value different from the first value.

Third Embodiment

Next, referring to FIGS. 10 and 11, a driver assistance system according to a third embodiment will be explained. Below, the points different from the driver assistance system according to the first embodiment will be focused on in the explanation.

Figure 10:
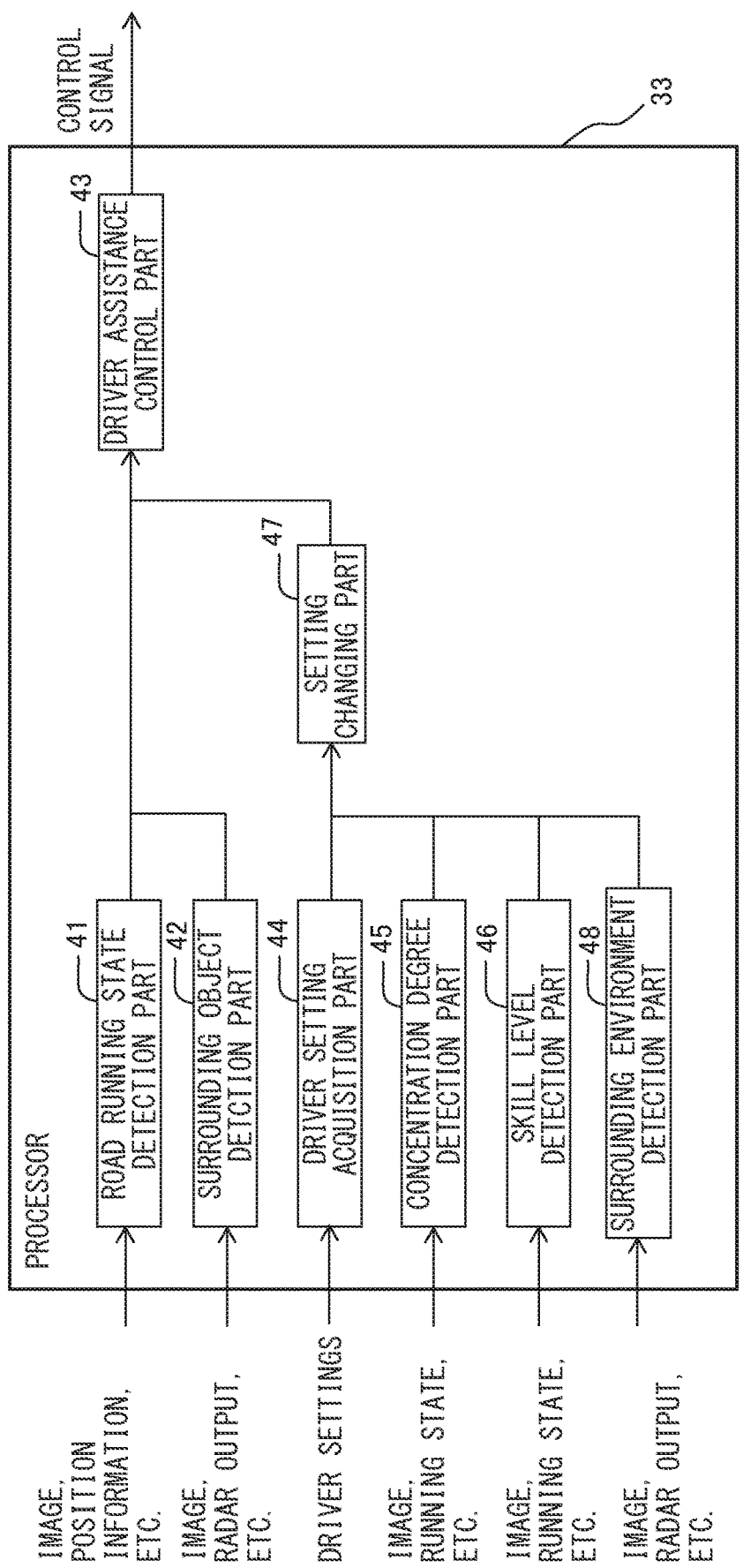
FIG. 10 is a functional block diagram, similar to FIG. 3, of a processor of an ECU relating to driver assistance processing in a driver assistance system according to a third embodiment.

FIG. 10 is a functional block diagram, similar to FIG. 3, of the processor 33 of the ECU 21 relating to driver assistance processing in the driver assistance system according to the third embodiment. The processor 33, similarly to that of FIG. 3, has a road running condition detection part 41, etc., and further is provided with a surrounding environment detection part 48.

The surrounding environment detection part 48 detects the environment of the surroundings of the vehicle 100. In particular, in the present embodiment, the surrounding environment detection part 48 is provided with a surrounding road environment detection part detecting the environment relating to the roads in the surroundings of the vehicle, and a surrounding object environment detection part detecting the environment relating to objects in the surroundings of the vehicle.

For example, the self position measured by the position measurement sensor 16 and the map information stored in the storage device 17 are input to the surrounding road environment detection part. The surrounding road environment detection part detects the road environment of the surroundings of the vehicle 100, based on the self position and map information, and outputs the results to the setting changing part 47. Specifically, the surrounding road environment detection part detects the road environment which the vehicle 100 is running over, among, for example, a winding mountain road, a straight highway, an ordinary road with numerous traffic lights, a parking lot and other roads. The surrounding road environment detection part inputs the detected road environment information around the vehicle 100 to the setting changing part 47. Note that, the surrounding road environment detection part may also detect the environment relating to the roads in the surroundings of the vehicle 100, based on the parameters detected by other sensors besides the position measurement sensor 16 and storage device 17 (for example, an image captured by the outside camera 14).

For example, an image captured by the outside camera 14 is input to the surrounding object environment detection part. The surrounding object environment detection part detects objects in the surroundings of the vehicle 100 captured in this image, by image recognition processing. As this image recognition processing, a neural network, support vector machine, or other known pattern recognition technique is used. In particular, the surrounding object environment detection part detects pedestrians or parked vehicles in the surroundings of the vehicle 100. The surrounding object environment detection part inputs the detected object environment information of the surroundings of the vehicle 100 to the setting changing part 47.

The setting changing part 47, basically similarly to the above embodiment, automatically changes the assistance levels of the driver assistance functions according to the degree of awakeness of the driver. However, in the present embodiment, the setting changing part 47 does not change the settings of some of the driver assistance functions depending on the environment of the surroundings of the vehicle 100.

Specifically, the setting changing part 47 does not change the assistance level of the ACC function based on the degree of awakeness of the driver, for example, when it is detected by the road environment detection part that the vehicle 100 is driving over a winding mountain road. Here, if the assistance level of the ACC function based on the degree of awakeness of the driver is changed, sometimes according to the degree of awakeness, the ACC function is automatically changed from the stopped state to the operating state. However, if the ACC function is automatically changed from the stopped state to the operating state when the vehicle 100 is running over a mountain road, for example, there is a possibility of the vehicle 100 being unsuitably driven such as entering a curve by a more than necessary high speed and comfort being lost. In such a case, by not changing the assistance level of the ACC function based on the degree of awakeness of the driver, the vehicle 100 is kept from being unsuitably driven in this way.

Note that, the setting changing part 47 may also be made to not change the assistance level of the ACC function not only when the vehicle 100 is running along a mountain road, but also when the vehicle 100 is running on another type of road where activation of the ACC function would result in less comfort.

Further, for example, when numerous pedestrians or a large number of other vehicles parked on the road are detected by the surrounding object environment detection part, the setting changing part 47 does not change the assistance levels of the lane changing assistance function and the ACC function based on the degree of awakeness of the driver. Specifically, the setting changing part 47 does not change the assistance levels of the lane change assistance function and ACC function (that is, driver assistance functions other than the collision avoidance assistance function) based on the degree of awakeness of the driver, when, for example, the presence of equal to or greater than a preset number of pedestrians in the direction of advance of the vehicle 100 is detected or when there are equal to or greater than a preset number of parked vehicles.

Here, if there are numerous pedestrians or other parked vehicles present in the advancing direction of the vehicle 100, the vehicle has to be driven while avoiding these pedestrians or parked vehicles. In this case, the vehicle 100 may, for example, have to be run near the road lane line or straddling the road lane line. If the lane changing assistance function is automatically changed from the stopped state to the operating state, there is a possibility of a warning being unsuitably issued or the vehicle 100 being unsuitably driven. In such a case, by not changing the assistance level of the ACC function based on the degree of awakeness of the driver, a warning is kept from being unsuitably issued or the vehicle 100 from being unsuitably driven.

Furthermore, parking lots often have no lanes. Further, in parking lots, a preceding vehicle should not be followed either. Therefore, in the present embodiment, the setting changing part 47, for example, does not change the assistance levels of the lane changing assistance function and ACC function based on the degree of awakeness of the driver when it is detected by the road environment detection part that the vehicle 100 is running through a parking lot.

Note that, the setting changing part 47 may also be made to not change the assistance level of the lane change assistance function not only when there are numerous pedestrians or parked vehicles in the direction of advance of the vehicle 100 or when the vehicle 100 is running in a parking lot, but also in other cases where running near or over the road lane line is inevitably necessary or other cases where there are no road lane lines on the road on which the vehicle 100 is running. Similarly, the setting changing part 47 may also be made to not change the assistance level of the ACC function, when there are pedestrians or parked vehicles or other obstacles scattered in the direction of advance of the vehicle 100 or in other cases where the preceding vehicle should not be followed.

Figure 11:
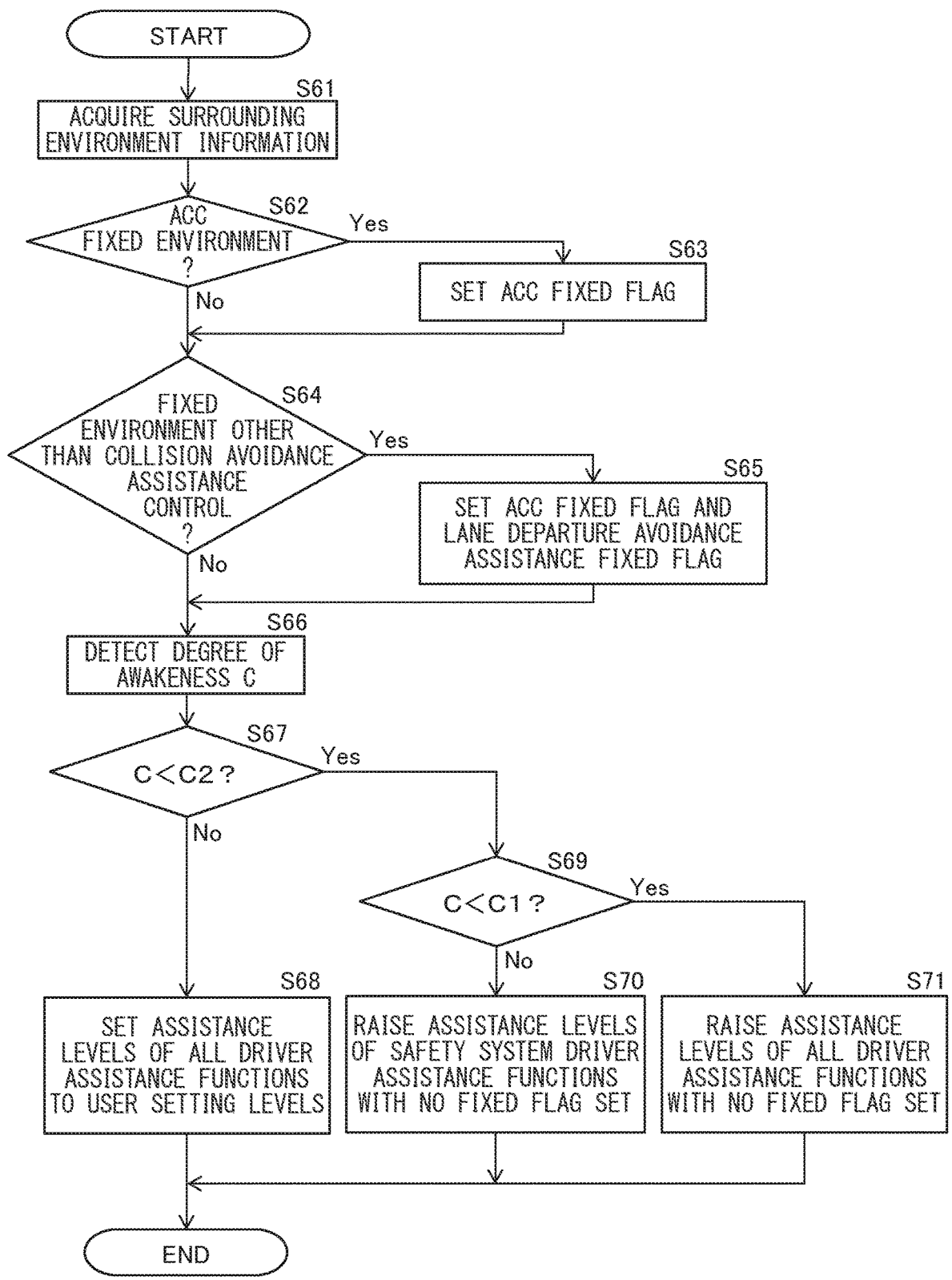
FIG. 11 is a flow chart of processing for setting an assistance level performed in a setting changing part.

FIG. 11 is a flow chart of processing for setting the assistance levels performed by the setting changing part 47. The illustrated processing is performed every certain time interval.

The setting changing part 47 first acquires the environment information of the surroundings of the vehicle 100, that is, the environment information relating to the roads at the surroundings of the vehicle 100 and the environment information relating to the objects at the surroundings of the vehicle 100, from the surrounding environment detection part 48 (step S61). After that, the setting changing part 47 judges if the acquired surrounding environment is an environment where the ACC function should be fixed (for example, during running on a mountain road) (step S62). If it is judged that the acquired surrounding environment is an environment where the ACC function should be fixed, the ACC fixing flag is set (step S63).

After that, the setting changing part 47 judges if the acquired surrounding environment is an environment in which the driver assistance functions other than the collision avoidance assistance function should be fixed (for example, an environment in which there are many pedestrians or parked vehicles in the advancing direction) (step S64). If it is judged that the acquired surrounding environment is an environment in which the driver assistance functions other than the collision avoidance assistance function should be fixed, the ACC fixing flag and lane departure avoidance assistance fixing flag are set (step S65).

Next, the setting changing part 47 acquires the degree of awakeness of the driver C from the concentration degree detection part 45 (step S66). After that, the setting changing part 47 judges if the acquired degree of awakeness C is smaller than the second reference value C2 (step S67). If at step S67 it is judged that the acquired degree of awakeness C is equal to or greater than the second reference value C2 (C≥C2), the setting changing part 47 sets the assistance levels of all of the driver assistance functions to the levels set by the driver (step S68).

On the other hand, if at step S67 it is judged that the acquired degree of awakeness C is smaller than the second reference value C2 (C<C2), the setting changing part 47 judges if the acquired degree of awakeness C is smaller than the first reference value C1 (step S69). If at step S69 it is judged that the acquired degree of awakeness C is equal to or greater than the first reference value C1 (C≥C1), the setting changing part 47 makes the assistance levels of the safety system driver assistance functions other than the driver assistance functions with the fixing flags set at the step S63 and the step S65 rise (step S70). If at step S69 it is judged that the acquired degree of awakeness C is smaller than the first reference value C1 (C<C1), the setting changing part 47 makes the assistance levels of all of the driver assistance functions other than the driver assistance functions with fixing flags set at step S63 and step S65 rise (step S71).

Fourth Embodiment

Next, referring to FIGS. 12 and 13, a driver assistance system according to a fourth embodiment will be explained. Below, the points different from the driver assistance system according to the first embodiment will be focused on in the explanation.

FIG. 12 is a functional block diagram, similar to FIG. 3, of the processor 33 of the ECU 21 relating to the driver assistance processing in the driver assistance system according to the fourth embodiment. The processor 33 has a road running condition detection part 41, etc., similar to that of FIG. 3, and is further provided with a driving environment detection part 49.

The driving environment detection part 49 detects the driving environment of the driver relating to the future degree of concentration of the driver. The driving environment relating to the future degree of concentration means the driving environment able to be a factor where the future degree of concentration of the driver changes. The driving environment of the driver relating to the future degree of concentration specifically, for example, includes the hours in which the driver is driving, the temperature inside the compartment of the vehicle 100, the type of road on which the vehicle 100 is running, etc. For example, if the hours in which the driver is driving is late hours at night, the degree of concentration of the driver is expected to fall. Further, if the temperature inside the compartment of the vehicle 100 is a comfortable temperature, the driver is expected to become drowsy and the degree of concentration to fall. Furthermore if the road on which the vehicle 100 is running is a highway, the changes in the road will be small and accordingly the degree of concentration is expected to fall.

For example, the information obtained from the outside server obtained by the outside communication module 19, a temperature detected by a temperature sensor (not shown) provided inside the compartment of the vehicle 100, an image captured by the outside camera 14, etc., are input to the driving environment detection part 49. The driving environment detection part 49 detects the hours in which the driver is driving based on the information relating to the time obtained from the outside server. Further, the driving environment detection part 49 detects the temperature at the inside of the compartment of the vehicle 100 based on the output of the temperature sensor. Furthermore, the driving environment detection part 49 detects the type of the road on which the vehicle 100 is currently running based on the image captured by the outside camera 14. Note that, the driving environment detection part 49 may also detect the type of the road on which the vehicle 100 is currently running based on the self position measured by the position measurement sensor 16 and the map information stored in the storage device 17. The driving environment detection part 49 inputs the detected driving environment of the vehicle 100 to the setting changing part 47.

The setting changing part 47, basically similarly to the above embodiment, changes the first reference value and the second reference value in accordance with the skill level of the driver relating to driving of the vehicle. In addition, in the present embodiment, the setting changing part 47 changes the first reference value and the second reference value in accordance with the driving environment of the driver. In particular, in the present embodiment, the setting changing part 47 increases the first reference value and the second reference value when the driving environment of the driver was an environment in which the future degree of concentration of the driver will fall. As a result, in an environment in which the future degree of concentration of the driver will fall, the assistance levels of the driver assistance functions are raised when the degree of concentration of the driver with respect to the driving of the vehicle is higher.

Note that, the setting changing part 47 may also change only one of the first reference value and the second reference value according to the driving environment of the driver. In this case, the other of the first reference value and the second reference value does not change in accordance with the driving environment of the driver. Therefore, the setting changing part 47 can be said to modify at least one of the first reference value and the second reference value so that the settings of the driver assistance functions are changed when the driving environment of the driver is an environment in which the future degree of concentration of the driver will fall.

In the present embodiment, in an environment in which it is expected that the future degree of concentration of the driver will fall, the assistance levels of the driver assistance functions are raised at an early stage. Therefore, according to the present embodiment, it is possible to adjust the assistance levels of the driver assistance functions to suitable levels at an early stage.

FIG. 13 is a flow chart of processing for setting the first reference value and the second reference value relating to the degree of awakeness. The illustrated processing is performed every certain time interval.

As shown in FIG. 13, the setting changing part 47 acquires the skill level of the driver from the skill level detection part 46 (step S81). Next, the setting changing part 47 acquires the driving environment information of the driver from the driving environment detection part 49 (step S82). After that, the setting changing part 47 sets the first reference value C1 and the second reference value C2 based on acquired skill level and the driving environment (step S83). The thus set first reference value C1 and second reference value C2 are used in steps S12 and S14, etc., of FIG. 5.

Above, preferred embodiments according to the present disclosure were explained, but the present disclosure is not limited to these embodiments and can be modified and changed in various ways within the language of the claims.

The invention claimed is:

1. A driver assistance system provided with a driver assistance control device,
   the driver assistance control device is configured to:
   detect a value of a parameter relating to a degree of concentration of a driver with respect to driving of the vehicle;
   acquire assistance levels of driver assistance functions set by the driver;
   perform a plurality of driver assistance functions assisting driving by the driver; and
   automatically change settings of the plurality of driver assistance functions in accordance with the detected value of the parameter, wherein
   the driver assistance control device automatically changes the settings of first driver assistance functions including at least one of a plurality of driver assistance functions so that the assistance levels become higher than the levels set by the driver when the degree of concentration of the driver with respect to driving of the vehicle becomes lower and the value of the parameter becomes a first value, and automatically changes the settings of second driver assistance functions including at least another of a plurality of driver assistance functions so that the assistance levels become higher than the levels set by the driver when the degree of concentration of the driver with respect to driving of the vehicle becomes lower and the value of the parameter becomes a second value different from the first value;
   wherein even if the value of the parameter changes to a value showing a higher degree of concentration of the driver with respect to driving of the vehicle than the first value or the second value after automatically changing the setting of the collision avoidance assistance function from the stopped state to the operating state, the driver assistance control device does not change the setting of the collision avoidance assistance function from the operating state to the stopped state.

2. The driver assistance system according to claim 1, wherein
   the first driver assistance functions are auxiliary system driver assistance functions for assisting driving by the driver and the second driver assistance functions are safety system driver assistance functions for raising the safety of the vehicle,
   the auxiliary system driver assistance functions include an adaptive cruise control function adjusting a speed of the vehicle so as to following a preceding vehicle at a certain distance,
   the safety system driver assistance functions include at least one driver assistance function among a collision avoidance assistance function assisting avoidance of collision with an object at the surroundings of the vehicle and a lane departure avoidance assistance function assisting avoidance of departure of the vehicle from a lane being run on.

3. The driver assistance system according to claim 2, wherein the second value is a value showing a higher degree of concentration of the driver with respect to driving of the vehicle, compared with the first value.

4. The driver assistance system according to claim 2, wherein the second value is a value showing a lower degree of concentration of the driver with respect to driving of the vehicle, compared with the first value.

5. The driver assistance system according to claim 2, wherein
the driver assistance control device is configured to further detect a surrounding environment of the vehicle, and
the driver assistance control device does not change the settings of part of the driver assistance functions without regard as to the value of the parameter, when the surrounding environment is in a specific environment.

6. The driver assistance system according to of claim 2, wherein when after automatically changing the assistance levels of the driver assistance functions, the value of the parameter changes to a value showing a higher degree of concentration of driver with respect to driving of the vehicle than the first value or the second value, the driver assistance control device returns the assistance levels of the driver assistance functions to the levels before the automatic change.

7. The driver assistance system according to claim 2, wherein when after automatically changing the assistance levels of the driver assistance functions, the user manually changes the settings of the assistance levels of the driver assistance functions, the driver assistance control device does not automatically change the assistance levels of the driver assistance functions even if the value of the parameter becomes a value showing a lower degree of concentration of the driver with respect to driving of the vehicle compared with the first value or second value.

8. The driver assistance system according to claim 2,
the driver assistance control device is configured to further detect a driving environment of a driver relating to a future degree of concentration of the driver, wherein
the driver assistance control device modifies at least one of the first value and the second value, when the driving environment of the driver is an environment where the future degree of concentration of the driver will fall.

9. The driver assistance system according to claim 1, wherein
the driver assistance control device is configured to further detect a skill level of a driver relating to driving of the vehicle, and
the driver assistance control device modifies at least one of the first value and the second value so that the settings of the driver assistance functions are changed when the degree of concentration is lower as the skill level of the driver is higher.

* * * * *